(12) United States Patent
Vajapeyam et al.

(10) Patent No.: US 10,701,699 B2
(45) Date of Patent: *Jun. 30, 2020

(54) UPLINK TRANSMIT POWER ALLOCATION AND POWER HEADROOM REPORTING BY A USER EQUIPMENT IN A MULTI-CONNECTIVITY ENVIRONMENT

(71) Applicant: QUALCOMM Incorporated, San Diego, CA (US)

(72) Inventors: Madhavan Srinivasan Vajapeyam, San Diego, CA (US); Wanshi Chen, San Diego, CA (US); Jelena Damnjanovic, Del Mar, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/126,139

(22) Filed: Sep. 10, 2018

(65) Prior Publication Data
US 2019/0007948 A1 Jan. 3, 2019

Related U.S. Application Data

(63) Continuation of application No. 14/607,348, filed on Jan. 28, 2015, now Pat. No. 10,085,265.
(Continued)

(51) Int. Cl.
*H04W 4/00* (2018.01)
*H04W 72/04* (2009.01)
(Continued)

(52) U.S. Cl.
CPC ..... *H04W 72/0473* (2013.01); *H04W 52/146* (2013.01); *H04W 52/346* (2013.01); *H04W 52/367* (2013.01); *H04W 52/365* (2013.01)

(58) Field of Classification Search
CPC ........... H04W 72/0473; H04W 52/146; H04W 52/346; H04W 52/367; H04W 52/365; H04W 52/14; H04W 72/04
(Continued)

(56) References Cited

U.S. PATENT DOCUMENTS

| 2013/0058315 A1 | 3/2013 | Feuersanger et al. |
| 2013/0100925 A1 | 4/2013 | Ahn et al. |

(Continued)

FOREIGN PATENT DOCUMENTS

| JP | 2014522212 A | 8/2014 | |
| WO | WO-2013025562 A2 * | 2/2013 | .......... H04W 52/146 |

(Continued)

OTHER PUBLICATIONS

European Search Report—EP18213452—Search Authority—The Hague—dated Apr. 11, 2019.
(Continued)

*Primary Examiner* — Mang Hang Yeung
(74) *Attorney, Agent, or Firm* — Holland & Hart LLP

(57) ABSTRACT

Techniques for wireless communication are described, which may include establishing a connection, by a user equipment (UE), with a first and second evolved NodeB (eNB), wherein each of the eNBs provide radio resources to the UE for respective uplink communications; receiving from the first eNB, at the UE, an indication including an allocation of uplink transmit power between the first eNB and at least the second eNB; and transmitting the uplink communications from the UE to the first and second eNBs based on the indication. The techniques may further include coordinating, by a first eNB, multi-connectivity communication for a UE with at least the first eNB and a second eNB; determining for the UE, at the eNB, an allocation of uplink transmit power between the first eNB and at least the second
(Continued)

eNB; and transmitting an indication including the allocation of uplink transmit power allocation from the first eNB to the UE.

24 Claims, 17 Drawing Sheets

Related U.S. Application Data

(60) Provisional application No. 61/933,829, filed on Jan. 30, 2014.

(51) Int. Cl.
*H04W 52/14* (2009.01)
*H04W 52/34* (2009.01)
*H04W 52/36* (2009.01)

(58) Field of Classification Search
USPC .......................... 370/329; 455/450, 464, 509
See application file for complete search history.

(56) References Cited

U.S. PATENT DOCUMENTS

| | | | |
|---|---|---|---|
| 2013/0176953 A1* | 7/2013 | Stern-Berkowitz | ............... H04W 52/146 370/329 |
| 2015/0215943 A1 | 7/2015 | Vajapeyam et al. | |
| 2016/0080126 A1 | 3/2016 | Dinan | |
| 2016/0323835 A1 | 11/2016 | Chen et al. | |

FOREIGN PATENT DOCUMENTS

| WO | WO2013025562 A2 | 2/2013 |
|---|---|---|
| WO | WO-2013158511 A1 | 10/2013 |

OTHER PUBLICATIONS

International Search Report and Written Opinion—PCT/US2015/013416—ISA/EPO—dated Apr. 8, 2015.
Panasonic: "Uplink transmission power management and PHR reporting for dual connectivity", 3GPP Draft; R2-133945, 3rd Generation Partnership Project (3GPP), Mobile Competence Centre; 650, Route Des Lucioles; F-06921 Sophia-Antipolis Cedex; France, vol. RAN WG2, no. San Francisco, USA; Nov. 11, 2013-Nov. 15, 2013, Nov. 13, 2013 (Nov. 13, 2013), XP050736772, Retrieved from the Internet: URL:http://www.3gpp.org/ftp/Meetings_3GPP_SYNC/RAN/RAN2/Docs/ [retrieved on Nov. 13, 2013].
Samsung: "Power headroom report for inter-ENB CA", 3GPP Draft; R2-133823, 3rd Generation Partnership Project (3GPP), Mobile Competence Centre; 650, Route Des Lucioles; F-06921 Sophia-Antipolis Cedex; France, vol. RAN WG2, No. San Francisco; Nov. 11, 2013-Nov. 15, 2013, Nov. 13, 2013 (Nov. 13, 2013), XP050736668, Retrieved from the Internet: URL:http://www.3gpp.org/ftp/Meetings_3GPP_SYNC/RAN/RAN2/Docs/ [retrieved on Nov. 13, 2013].

\* cited by examiner

UPLINK TRANSMIT POWER ALLOCATION AND POWER HEADROOM REPORTING BY A USER EQUIPMENT IN A MULTI-CONNECTIVITY ENVIRONMENT

CROSS REFERENCES

The present Application for Patent is a continuation of U.S. patent application Ser. No. 14/607,348 bu Vajapeyam, et al., entitled "Uplink Transmit Power Allocation and Power Headroom Reporting By A User Equipment In A Multi-Connectivity Environment" filed Jan. 28, 2015, and claims priority to U.S. Provisional Patent Application No. 61/933,829 by Vajapeyam et al., entitled "Uplink Transmit Power Allocation And Power Headroom Reporting By A User Equipment In A Multi-Connectivity Environment," filed Jan. 30, 2014, assigned to the assignee hereof, and expressly incorporated by reference herein.

BACKGROUND

Field of the Disclosure

The following relates generally to wireless communication, and more specifically to selecting coverage enhancement techniques.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

Generally, a wireless multiple-access communications system may include a number of evolved NodeBs (eNBs), each simultaneously supporting communication for multiple user equipments (UEs). An eNB may communicate with a UE on both downstream communication links (in which data or control signals are transmitted from the eNB to the UE) and upstream communication links (in which data or control signals are transmitted from the UE to the eNB).

In a multi-connectivity environment (e.g., multiflow), a UE may connect simultaneously to two or more eNBs. Additionally, the UE may be constrained by a maximum transmit power. The eNBs may attempt to separately control an uplink transmit power of the UE, which may at times result in a request for the UE to exceed the maximum transmit power in place.

SUMMARY

The described methods, systems, and devices generally enable a UE in a multi-connectivity environment to allocate uplink transmit power between a first eNB and a second eNB, or enable a UE to report power headroom to a first eNB or a second eNB, or enable a UE to modify an allocation of uplink transmit power between a first eNB and a second eNB (e.g., borrow power from an eNB or cell and allocate the power to another eNB or cell).

According to a first aspect of the disclosure, a method of wireless communication by a user equipment (UE) is described. In one configuration, the method may include establishing a connection with a first evolved NodeB (eNB) and a second eNB, wherein each of the first eNB and the second eNB provide radio resources to the UE for respective uplink communications; receiving from the first eNB, at the UE, an indication including an allocation of uplink transmit power between the first eNB and at least the second eNB; and transmitting the uplink communications from the UE to the first eNB and the second eNB based on the indication.

According to another aspect of the disclosure, a device for wireless communication by a UE is described. In one configuration, the device may include means for establishing a connection with a first evolved NodeB (eNB) and a second eNB, wherein each of the first eNB and the second eNB provide radio resources to the UE for respective uplink communications; means for receiving from the first eNB, at the UE, an indication comprising an allocation of uplink transmit power between the first eNB and at least the second eNB; and means for transmitting the uplink communications from the UE to the first eNB and the second eNB based on the indication.

According to another aspect of the disclosure, a device for wireless communication by a UE may include a processor and a memory in electronic communication with the processor. Instructions may be stored in the memory, the instructions being executable by the processor to establish a connection with a first evolved NodeB (eNB) and a second eNB, wherein each of the first eNB and the second eNB provide radio resources to the UE for respective uplink communications; receive from the first eNB, at the UE, an indication comprising an allocation of uplink transmit power between the first eNB and at least the second eNB; and transmit the uplink communications from the UE to the first eNB and the second eNB based on the indication.

According to another aspect of the disclosure, a non-transitory computer-readable medium storing code for wireless communication by a UE is described. The code may include instructions executable to: establish a connection with a first evolved NodeB (eNB) and a second eNB, wherein each of the first eNB and the second eNB provide radio resources to the UE for respective uplink communications; receive from the first eNB, at the UE, an indication comprising an allocation of uplink transmit power between the first eNB and at least the second eNB; and transmit the uplink communications from the UE to the first eNB and the second eNB based on the indication.

In certain examples of the method, devices, or non-transitory computer-readable medium described above, the indication may be based at least in part on an uplink/downlink (UL/DL) configuration of the first eNB or the second eNB when the first eNB or the second eNB operates in a time division duplex (TDD) mode. The indication may, for example, include a time index.

In certain examples of the method, devices, or non-transitory computer-readable medium described above, the indication may include an indication of subframes on which substantially all uplink transmit power is allocated to the first eNB or to the second eNB. Additionally or alternatively, the indication comprises an allocation of total uplink transmit power between communications with the first eNB and the second eNB.

Some examples of the method, devices, or non-transitory computer-readable medium described above may further include processes, features, means, or instructions for generating a power headroom report at the UE, the power headroom report including power headroom information for both the first eNB and the second eNB, and processes, features, means, or instructions for transmitting the power headroom report to the first eNB. The power headroom information may be based at least in part on scheduling information from both the first eNB and the second eNB; and the first eNB and the second eNB may schedule communications with the UE on different sets of resources.

In certain examples of the method, devices, or non-transitory computer-readable medium described above, a second indication comprising an allocation of uplink transmit power may be received from the first eNB in response to the power headroom report, wherein the second indication changes the allocation of uplink transmit power allocated to the first eNB or the second eNB. Power headroom may be determined for the first eNB and the second eNB with respect to the uplink transmit power allocated to the first eNB or the second eNB after receiving the second indication.

Some examples of the method, devices, or non-transitory computer-readable medium described above may further include processes, features, means, or instructions for transmitting the power headroom report to the first eNB or the second eNB in response to a triggering message received from the first eNB or the second eNB. The triggering message may include an indication that the first eNB or the second eNB has activated an uplink cell.

Some examples of the method, devices, or non-transitory computer-readable medium described above may further include processes, features, means, or instructions for transmitting the power headroom report to the second eNB. Transmitting the power headroom report to the second eNB may be based on a determination that uplink resources are allocated to the UE for an uplink transmission to the second eNB.

In certain examples of the method, devices, or non-transitory computer-readable medium described above, triggering the power headroom report at the UE may be based on a determination that an allocation of uplink transmit power of the UE for the first eNB or the second eNB has crossed a threshold. The threshold may include a maximum uplink transmit power for the first eNB or the second eNB.

Some examples of the method, devices, or non-transitory computer-readable medium described above may further include processes, features, means, or instructions for triggering the power headroom report at the UE based on a measured pathloss of the second eNB.

Some examples of the method, devices, or non-transitory computer-readable medium described above may include processes, features, means, or instructions for generating a power headroom report at the UE, the power headroom report including power headroom information for the second eNB. The methods, devices, or non-transitory computer-readable medium described above may further include processes, features, means, or instructions for transmitting the power headroom report to the second eNB.

Some examples of the method, devices, or non-transitory computer-readable medium described above may further include processes, features, means, or instructions for modifying, by the UE, the allocation of uplink transmit power between the first eNB and the second eNB. The modification of the allocation of uplink transmit power may be based on a priority of uplink data or control information for one of the eNBs with respect to the other of the eNBs. A power headroom report may be triggered at the UE based on the modification by the UE of the allocation of uplink transmit power between the first eNB and the second eNB. The power headroom report may include an indication that an uplink transmit power for one of the first eNB or the second eNB has exceeded a maximum transmit power allocated to that eNB. A second indication may be received from the first eNB, the second indication including an allocation of uplink transmit power between the first eNB and the second eNB. The second indication may be in response to the modification, by the UE, of the allocation of uplink transmit power between the first eNB and the second eNB.

Some examples of the method, devices, or non-transitory computer-readable medium described above may further include processes, features, means, or instructions for determining an allocation of uplink transmit power between a plurality of cells controlled by the first eNB or the second eNB based on the indication.

Some examples of the method, devices, or non-transitory computer-readable medium described above may further include processes, features, means, or instructions for determining, at the UE, an uplink transmit power for each of a plurality of cells controlled by the first eNB or the second eNB based on the indication.

In certain examples of the method, devices, or non-transitory computer-readable medium described above, the first eNB may be a master eNB and the second eNB may be a secondary eNB.

According to another aspect of the disclosure, a method of wireless communication is described. In one configuration, the method may include coordinating, by a first eNB, multi-connectivity communication for a UE with at least the first eNB and a second eNB; determining for the UE, at the eNB, an allocation of uplink transmit power between the first eNB and at least the second eNB; and transmitting an indication including the allocation of uplink transmit power allocation from the first eNB to the UE.

According to another aspect of the disclosure, a device for wireless communication, may include means for coordinating, by a first evolved NodeB (eNB), multi-connectivity communication for a user equipment (UE) with at least the first eNB and a second eNB; means for determining for the UE, at the eNB, an allocation of uplink transmit power between the first eNB and at least the second eNB; and means for transmitting an indication comprising the allocation of uplink transmit power allocation from the first eNB to the UE.

According to another aspect of the disclosure, a device for wireless communication may include a processor, memory in electronic communication with the processor, and instructions stored in the memory. The instructions may be executable by the processor to: coordinate, by a first evolved NodeB (eNB), multi-connectivity communication for a user equipment (UE) with at least the first eNB and a second eNB; determine for the UE, at the eNB, an allocation of uplink transmit power between the first eNB and at least the second eNB; and transmit an indication comprising the allocation of uplink transmit power allocation from the first eNB to the UE.

According to another aspect of the disclosure, a non-transitory computer-readable medium storing code for wireless communication is described. The code may include instructions executable to: coordinate, by a first evolved NodeB (eNB), multi-connectivity communication for a user equipment (UE) with at least the first eNB and a second eNB; determine for the UE, at the eNB, an allocation of uplink transmit power between the first eNB and at least the second eNB; and transmit an indication comprising the allocation of uplink transmit power allocation from the first eNB to the UE.

In certain examples of the method, devices, or non-transitory computer-readable medium described above, a power headroom report may be received from the UE, the power headroom report including power headroom information for at least the first eNB and the second eNB. The allocation of uplink transmit power between the first eNB and the second eNB for the UE may be adjusted based on the power headroom report.

In certain examples of the method, devices, or non-transitory computer-readable medium described above, an adjusted allocation of uplink transmit power between the first eNB and the second eNB may be determined based on the power headroom report. The adjusted allocation of uplink transmit power may be transmitted to at least one of the UE or the second eNB. The power headroom report may be received in response to at least one of: an uplink transmit power of the UE for the second eNB, a measured pathloss variation for the second eNB, or the second eNB activating an uplink cell.

In certain examples of the method, devices, or non-transitory computer-readable medium described above, a determination may be made, based on the power headroom report, that the UE has modified the allocation of uplink transmit power between the first eNB and the second eNB. The adjusted allocation of uplink transmit power between the first eNB and the second eNB for the UE may be based on the modification by the UE to the allocation of uplink transmit power between the first eNB and the second eNB.

In certain examples of the method, devices, or non-transitory computer-readable medium described above, the power headroom report may be transmitted from the first eNB to the second eNB.

Some examples of the method, devices, or non-transitory computer-readable medium described above may further include processes, features, means, or instructions for adjusting the allocation of uplink transmit power between the first eNB and the second eNB based on a message received at the first eNB from the second eNB.

In certain examples of the method, devices, or non-transitory computer-readable medium described above, the allocation of uplink transmit power between the first eNB and the second eNB may be based at least in part on an uplink/downlink (UL/DL) configuration of the first eNB or the second eNB.

In certain examples of the method, devices, or non-transitory computer-readable medium described above, the indication may include a time index.

In certain examples of the method, devices, or non-transitory computer-readable medium described above, the allocation of uplink transmit power between the first eNB and the second eNB may include an allocation of uplink transmit power between a plurality of cells of the first eNB or the second eNB.

Some examples of the method, devices, or non-transitory computer-readable medium described above may further include processes, features, means, or instructions for transmitting the allocation of uplink transmit power from the first eNB to the second eNB. Transmitting the allocation of uplink transmit power from the first eNB to the second eNB may include transmitting a message containing the allocation of uplink transmit power over an X2 interface between the first eNB and the second eNB.

In certain examples of the method, devices, or non-transitory computer-readable medium described above, communications between the UE and the first eNB may be scheduled independently from communications between the UE and the second eNB.

In certain examples of the method, devices, or non-transitory computer-readable medium described above, the first eNB may be a master eNB and the second eNB may be a secondary eNB.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
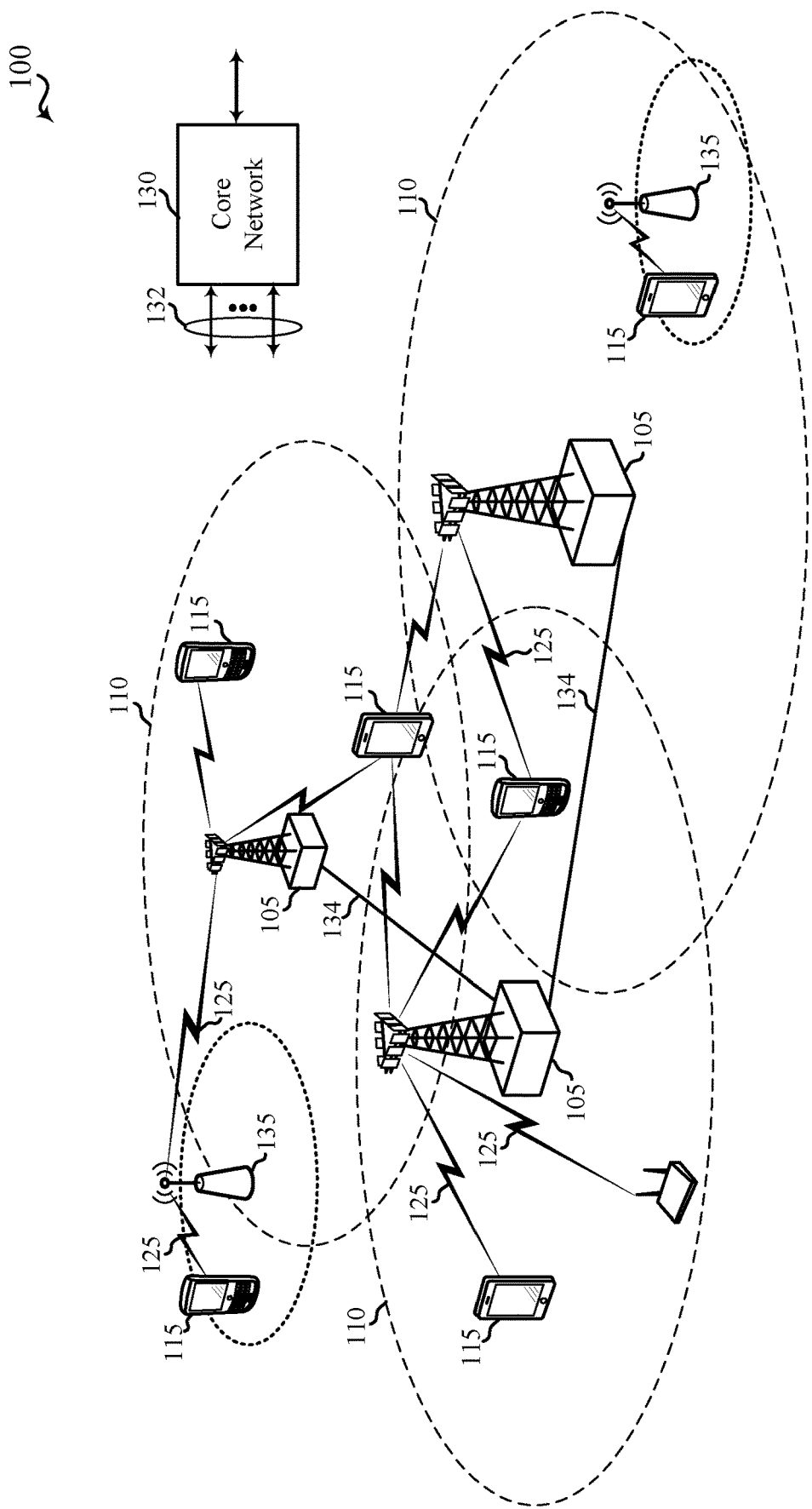
FIG. 1 shows a block diagram of a wireless communication system, in accordance with various aspects of the present disclosure.

In a multi-connectivity environment such as a multiflow environment, a UE may connect simultaneously to two or more eNBs. In such an environment, the UE may concurrently provide a physical uplink shared channel (PUSCH) or a physical uplink control channel (PUCCH) for each eNB to which the UE connects. Additionally, the UE may be constrained by a maximum transmit power affecting all uplink communications in aggregate. Thus, as described herein, to prevent a UE from exceeding its maximum transmit power, the eNBs to which the UE connects may coordinate with each other to determine an allocation of uplink transmit power between the eNBs. To aid in this determination, power headroom reports from the UE to one of the eNBs may include power headroom information for each of the eNBs to which the UE is currently connected.

A wireless communication system, such as a 3GPP "Long Term Evolution" (LTE) or "LTE-Advanced" (LTE-A) wireless communication system, may provide for various modes of communication between the UE and one or more eNBs. Some of the modes of communication enable a UE to simultaneously connect to multiple cells of one or more eNB s.

In a carrier aggregation mode of communication, a UE in an RRC_CONNECTED state may connect to multiple cells of a single eNB and consume radio resources provided by each of the cells. Because all of the cells are managed by a single eNB, communications between the UE and the multiple cells may be scheduled by the single eNB and there may be tight coordination amongst the cells.

In a coordinated multi-point (CoMP) mode of communication, a UE in an RRC_CONNECTED state may consume radio resources provided by more than one eNB. Despite the cells being managed by more than one eNB, there may be tight coordination amongst the cells. The tight coordination may be provided, for example, as a result of communications being made over the same carrier or as a result of an ideal backhaul between the multiple eNBs. The ideal backhaul may enable a fast transmission of feedback between the multiple eNBs. Also, communications between the UE and the multiple eNBs may be scheduled by a single eNB.

In a multi-connectivity mode of communication, a UE in an RRC_CONNECTED state may connect to multiple cells managed by more than one eNB and consume radio resources provided by each of the eNBs. Examples of multi-connectivity include, but are not limited to, multiflow and dual-connectivity. However, because communications with different eNBs may be made over different carriers and be independently scheduled by different eNBs, and because there may exist a non-ideal backhaul that provides slower transmission of feedback between eNBs, only loose coordination may exist amongst the cells of different eNBs.

The techniques described herein are not limited to LTE/LTE-A wireless communication systems, and may also be used for various wireless communication systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). LTE and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE/LTE-A wireless communication system for purposes of example, and LTE/LTE-A terminology is used in much of the description below, although the techniques are applicable beyond LTE/LTE-A applications.

The following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

FIG. 1 shows a block diagram of a wireless communication system 100, in accordance with various aspects of the present disclosure. The wireless communication system 100 may include a plurality of evolved NodeBs (eNBs) 105 and eNBs 135, a number of user equipments (UEs) 115, and a core network 130. Some of the eNBs 105 or 135 may communicate control information or user data with the core network 130 through backhaul 132. In some embodiments, some of the eNBs 105 or 135 may communicate, either directly or indirectly, with each other over backhaul links 134, which may be wired or wireless communication links. The wireless communication system 100 may support operation on multiple carriers (waveform signals of different frequencies). Multi-carrier transmitters may transmit modulated signals simultaneously on the multiple carriers. For example, each communication link 125 may be a multi-carrier signal modulated according to various radio technologies. Each modulated signal may be sent on a different carrier and may carry control information (e.g., reference signals, control channels, etc.), overhead information, data, etc.

The eNBs 105 or 135 may wirelessly communicate with the UEs 115 via one or more eNB antennas. Each of the eNBs 105 or 135 may provide communication coverage for a respective coverage area 110. In some embodiments, an eNB 105 or 135 may be referred to as, or include, a base station, a base transceiver station (BTS), a radio base station, a radio transceiver, a basic service set (BSS), an extended service set (ESS), an evolved NodeB (eNB), a Home eNodeB, or some other suitable terminology. The coverage area 110 for an eNB 105 or 135 may be divided into sectors making up only a portion of the coverage area (not shown). The wireless communication system 100 may include eNBs 105 or 135 of different types (e.g., macro, micro, or pico eNBs). The eNBs 105 or 135 may be associated with the same or different access networks or mobile network operator (MNO) deployments. The coverage areas of different eNBs 105 or 135, including the coverage areas of the same or different types of eNBs, belonging to the same or different MNOs or access networks, may overlap.

In some embodiments, the wireless communication system 100 may include an LTE/LTE-A wireless communication system (or network). The wireless communication system 100 may be a Heterogeneous LTE/LTE-A/LTE-U network in which different types of eNBs provide coverage for various geographical regions. For example, each eNB 105 or 135 may provide communication coverage for a macro cell, a pico cell, a femto cell, or other types of cell. Small cells such as pico cells, femto cells, or other types of cells may include low power nodes or LPNs. A macro cell would generally cover a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The core network 130 may communicate with the eNBs 105 or 135 via a backhaul 132 or 134 (e.g., 51 application protocol, etc.). The eNBs 105 or 135 may also communicate with one another, e.g., directly or indirectly via backhaul links 134 (e.g., via an X2 interface, etc.) or via backhaul 132 (e.g., through core network 130). The wireless communication system 100 may support synchronous or asynchronous operation. For synchronous operation, the eNBs may have similar frame or gating timing, and transmissions from different eNBs may be approximately aligned in time. For asynchronous operation, the eNBs may have different frame or gating timing, and transmissions from different eNBs may not be aligned in time. The techniques described herein may be used for either synchronous or asynchronous operations.

The UEs 115 may be dispersed throughout the wireless communication system 100, and each UE 115 may be stationary or mobile. A UE 115 may also be referred to by those skilled in the art as a mobile device, a mobile station, a subscriber station, a mobile unit, a subscriber unit, a wireless unit, a remote unit, a wireless device, a wireless communication device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wearable item such as a watch or glasses, a wireless local loop (WLL) station, or the like. A UE 115 may be able to communicate with macro eNBs, pico eNBs, femto eNBs, relays, and the like. A UE 115 may also be able to communicate over different access networks, such as cellular or other WWAN access networks, or WLAN access networks.

The communication links 125 shown in wireless communication system 100 may include uplinks for carrying uplink (UL) transmissions (e.g., from a UE 115 to an eNB 105 or 135) or downlinks for carrying downlink (DL) transmissions (e.g., from an eNB 105 or 135 to a UE 115). The UL transmissions may also be called reverse link transmissions, while the DL transmissions may also be called forward link transmissions. In some cases, the UL or DL transmissions may be made using MIMO communications (e.g., spatially multiplexed communications).

As noted above, a UE 115 may connect to multiple eNBs 105 at the same time. In a multi-connectivity (e.g., multi-flow) arrangement, each of the eNBs 105 to which the UE 115 connects may independently schedule uplink and downlink transmissions between the UE 115 and that eNB 105. To prevent the UE 115 from exceeding a maximum transmit power in place for the UE 115, the eNBs 105 may communicate with each other to determine an allocation (e.g., a power allocation, a percentage allocation such as a percentage of uplink transmit power, etc.) of uplink transmit power between the eNBs to which the UE 115 is currently connected. This allocation may be signaled to the UE 115 by one or more of the eNBs 105, and may change over time. By transmitting on the uplink in accordance with the received allocation, the UE 115 may be prevented from exceeding the maximum transmit power set by the eNBs 105.

Figure 2:
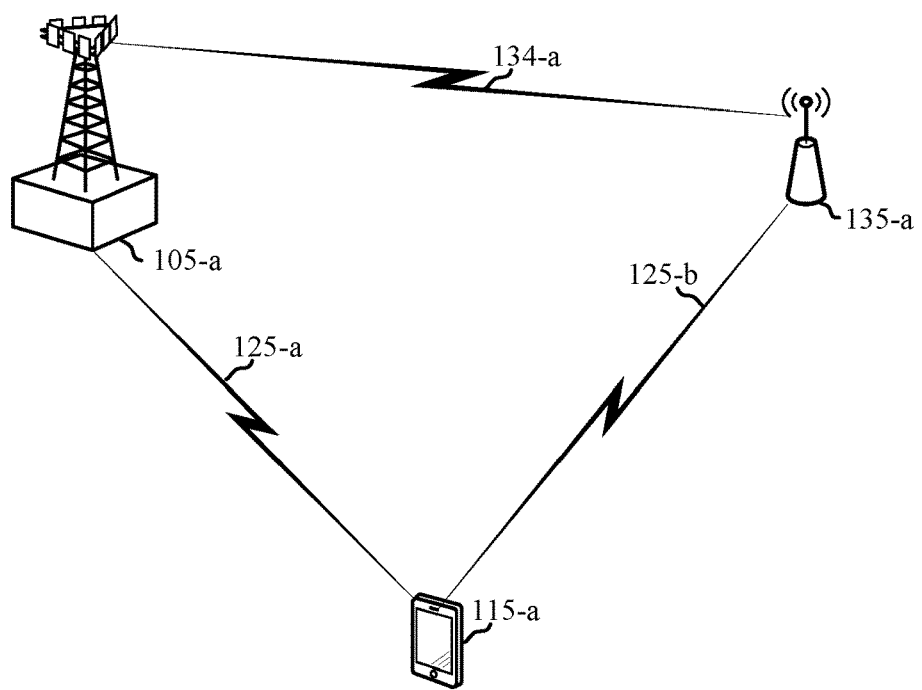
FIG. 2 shows a block diagram of a wireless communication system, in accordance with various aspects of the present disclosure.

FIG. 2 shows a block diagram of a wireless communication system 200, in accordance with various aspects of the present disclosure. The wireless communication system 200 may include a UE 115-$a$, a first eNB 105-$a$, and a second eNB 135-$a$. The UE 115-$a$, first eNB 105-$a$, or second eNB 135-$a$ may be respective examples of aspects of the UEs 115, eNBs 105, or eNBs 135 described with reference to FIG. 1. In some embodiments, the first eNB 105-$a$ may include a master eNB (MeNB) and the second eNB 135-$a$ may include a secondary eNB (SeNB).

In one mode of operation, the first eNB 105-$a$ may coordinate multi-connectivity communication for the UE 115-$a$, in which the UE 115-$a$ may communicate with one or more cells of the first eNB 105-$a$ (e.g., a master cell group (MCG) managed by the first eNB 105-$a$) over a communication link (or links) 125-$a$, and with one or more cells of the second eNB 135-$a$ (e.g., a secondary cell group (SCG) managed by the second eNB 135-$a$) over a communication link (or links) 125-$b$. The first eNB 105-$a$ and the second eNB 135-$a$ may transmit feedback information over a non-ideal backhaul link 134-$a$, such as a backhaul link implementing an X2 interface.

The first eNB 105-$a$ and the second eNB 135-$a$ may employ different media access control (MAC) entities with no coordination or very loose coordination.

In the wireless communication system 200, a race condition may arise in which the total uplink transmit power requested of the UE 115-$a$ by the first eNB 105-$a$ and the second eNB 135-$a$ exceeds the available uplink transmit power of the UE 115-$a$. Such a race condition may adversely affect the UE's performance. Techniques to allocate the available uplink transmit power of the UE between the first eNB 105-$a$ and the second eNB 135-$a$ (or between more than two eNBs) may therefore be useful. The techniques may adapt power headroom reporting to a multi-connectivity environment.

Figure 3:
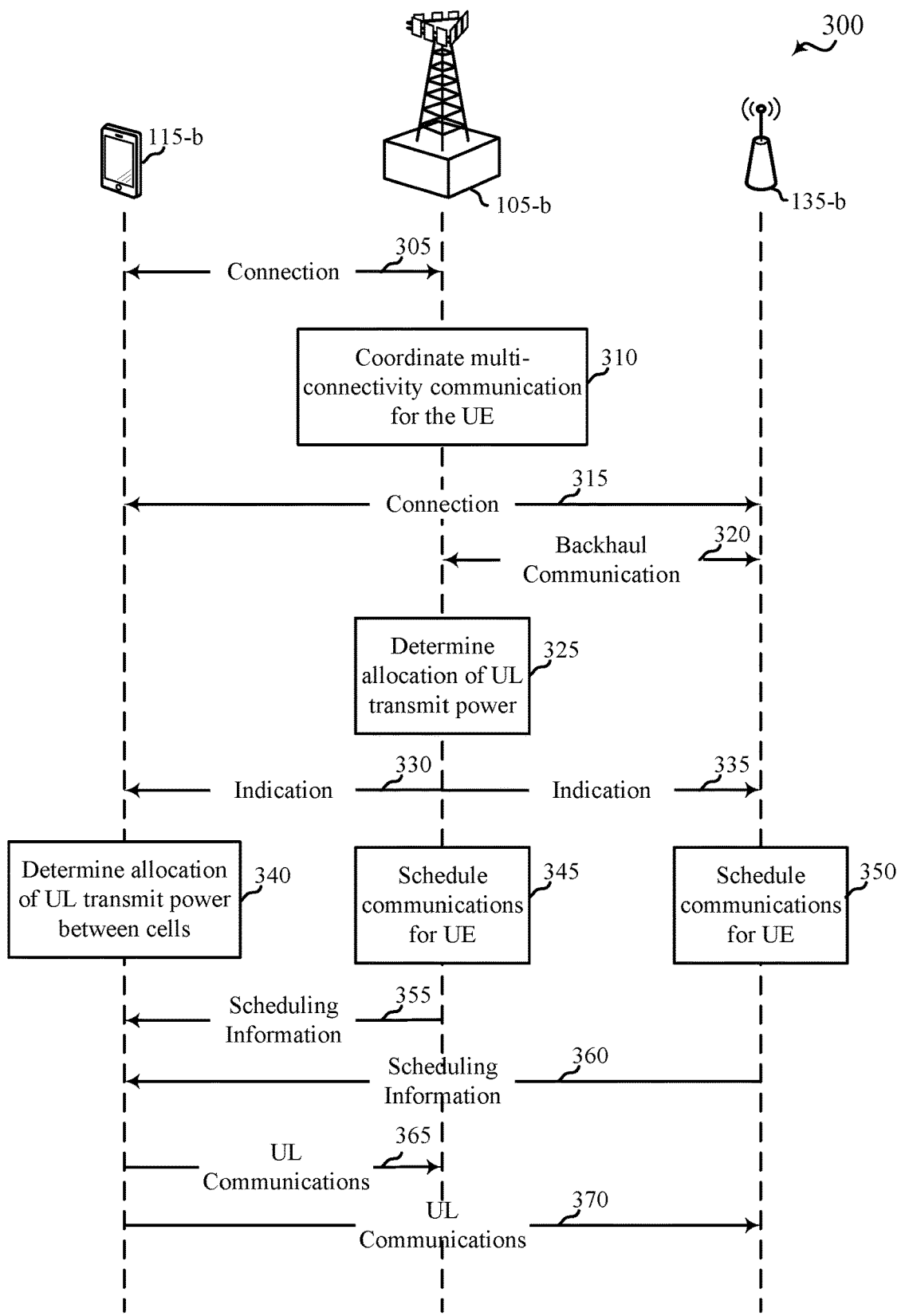
FIG. 3 shows a message flow between a UE, a first eNB, and at least a second eNB, in accordance with various aspects of the present disclosure.

Turning now to FIG. 3, there is shown a message flow 300 between a UE 115-*b*, a first eNB 105-*b*, and at least a second eNB 135-*b*, in accordance with various aspects of the present disclosure. Each of the UE 115-*b*, the first eNB 105-*b*, or the second eNB 135-*b* may be an example of aspects of a respective one of the UEs 115, the first eNBs 105, or the second eNBs 135 described with reference to FIG. 1 or 2. In some cases, the first eNB 105-*b* may include a master eNB and the second eNB 135-*b* may include a secondary eNB.

In the following description of the message flow 300, the messages between the UE 115-*b*, the first eNB 105-*b*, or the second eNB 135-*b* may be transmitted in a different order than the exemplary order shown, or the operations performed by the UE 115-*b*, the first eNB 105-*b*, or the second eNB 135-*b* may be performed in different orders or at different times. Certain messages or operations may also be left out of the message flow 300, or other messages or operations may be added to the message flow 300.

The message flow 300 may commence with the UE 115-*b* establishing a connection 305 with the first eNB 105-*b* and a connection 315 with the second eNB 135-*b*. Each of the first eNB 105-*b* and the second eNB 135-*b* may provide radio resources to the UE 115-*b* for respective uplink communications. Each of the first eNB 105-*b* and the second eNB 135-*b* may also provide radio resources to the UE 115-*b* for respective downlink communications. The first eNB 105-*b* may be used, at block 310, to coordinate multi-connectivity communication for the UE 115-*b* with the first eNB 105-*b* and the second eNB 135-*b*. To assist the first eNB 105-*b* in coordinating multi-connectivity communication for the UE 115-*b*, the first eNB 105-*b* may transmit or receive backhaul communications 320 with the second eNB 135-*b*. In some embodiments, the first eNB 105-*b* and the second eNB 135-*b* may communicate with the UE 115-*b* using different carriers, and thus, the backhaul communications 320 may be transmitted or received by means of a non-ideal backhaul link (e.g., a backhaul link implementing an X2 interface).

At block 325, the first eNB 105-*b* may determine an allocation (e.g., a power allocation, a percentage allocation such as a percentage of uplink transmit power, etc.) of uplink transmit power between the first eNB 105-*b* and at least the second eNB 135-*b* for the UE 115-*b*. The uplink transmit power may in some cases be a maximum uplink transmit power.

Upon making the determination at block 325, the first eNB 105-*b* may transmit an indication 330 of the allocation of uplink transmit power between the first eNB 105-*b* and at least the second eNB 135-*b* to the UE 115-*b*. In some cases, an indication 335 may also be transmitted to the second eNB 135-*b*. The indication(s) 330, 335 of the allocation of uplink transmit power may in some cases include an indication of a maximum uplink transmit power, or a percentage of maximum uplink transmit power, allocated to each of the first eNB 105-*b* and at least the second eNB 135-*b*.

In some examples, such as when the first eNB 105-*b* or the second eNB 135-*b* operates in a TDD mode, the indication 330 of the allocation of uplink transmit power between the first eNB 105-*b* and at least the second eNB 135-*b* may be based at least in part on an UL/DL configuration of the first eNB 105-*b* or the second eNB 135-*b*. For example, when an eNB operates in a TDD mode, the number of active uplink carriers can change over time based on the TDD configuration of each cell within the eNB. When the number of active uplink carriers used by an eNB is less during a particular time period, more of the total uplink transmit power available to the UE 115-*b* during the time period may be allocated to another eNB with which the UE 115-*b* may communicate during the time period. Conversely, more of the total uplink transmit power available to the UE 115-*b* during the time period may be allocated to an eNB when the number of active uplink carriers used by the eNB is greater during a particular time period.

In some examples, the indication 330 of the allocation of uplink transmit power between the first eNB 105-*b* and at least the second eNB 135-*b* may include an indication of subframes on which substantially all transmit power may be allocated to the first eNB 105-*b* or to the second eNB 135-*b*. For example, during a subframe or time period in which no uplink communications to an eNB are expected, substantially all uplink transmit power may be allocated to one or more other eNBs.

In some cases, the indication 330 may include a time index. The time index may be used to indicate the subframes or time periods in which an eNB is allocated a particular uplink transmit power, and may be used to allocate different uplink transmit powers to different eNBs within a subframe or time period. Thus, in certain examples, the indication 330 may include a set of values parameterized by the time index.

At block 340, and in some variations, the UE 115-*b* may determine an allocation of uplink transmit power between a plurality of cells of the first eNB 105-*b* or the second eNB 135-*b* based on the indication 330 of the allocation of uplink transmit power between the first eNB 105-*b* and at least the second eNB 135-*b*. The allocation of uplink transmit power between the plurality of cells may in some cases be semi-statically specified in the indication 330 (e.g., the first eNB 105-*b* may specify or configure an uplink transmit power value for each cell, which uplink transmit power value may be used by the UE until the UE receives, from the first eNB 105-*b*, an adjusted indication of the allocation of uplink transmit power between the first eNB 105-*b* and at least the second eNB 135-*b*). The allocation of uplink transmit power between the plurality of cells may in other cases be semi-statically specified per time index in the indication (e.g., the first eNB 105-*b* may specify or configure multiple uplink transmit power values for each cell, for each time index, which uplink transmit power values may be used by the UE 115-*b* until the UE 115-*b* receives, from the first eNB 105-*b*, an adjusted indication including an allocation of uplink transmit power between the first eNB 105-*b* and at least the second eNB 135-*b*).

At block 340, the indication 330 of the allocation of uplink transmit power between the first eNB 105-*b* and at least the second eNB 135-*b* may include an allocation of total transmit power between communications with the first eNB 105-*b* and the second eNB 135-*b*. In these embodiments, the UE 115-*b* may determine, at the UE 115-*b*, an uplink transmit power for each of a plurality of cells controlled by the first eNB 105-*b* or the second eNB 135-*b* based on the indication of the allocation of uplink transmit power between the first eNB 105-*b* and at least the second eNB 135-*b*. In some cases, the uplink transmit power per cell (e.g., the maximum uplink transmit power per cell) may be dynamically adjusted at the UE 115-*b*.

At block 345, the first eNB 105-*b* may schedule communications, including uplink communications, between the UE 115-*b* and the first eNB 105-*b*. At block 350, the second eNB 135-*b* may independently schedule communications, including uplink communications, between the UE 115-*b* and the second eNB 135-*b*. Upon receiving the scheduling information 355 or 360, the UE 115-*b* may transmit the uplink communications 365 to the first eNB 105-*b* and transmit the uplink communications 370 to the second eNB 135-*b* based on the indication 330 of the allocation of uplink transmit power between the first eNB 105-*b* and at least the second eNB 135-*b* for the UE 115*b*.

Figure 4:
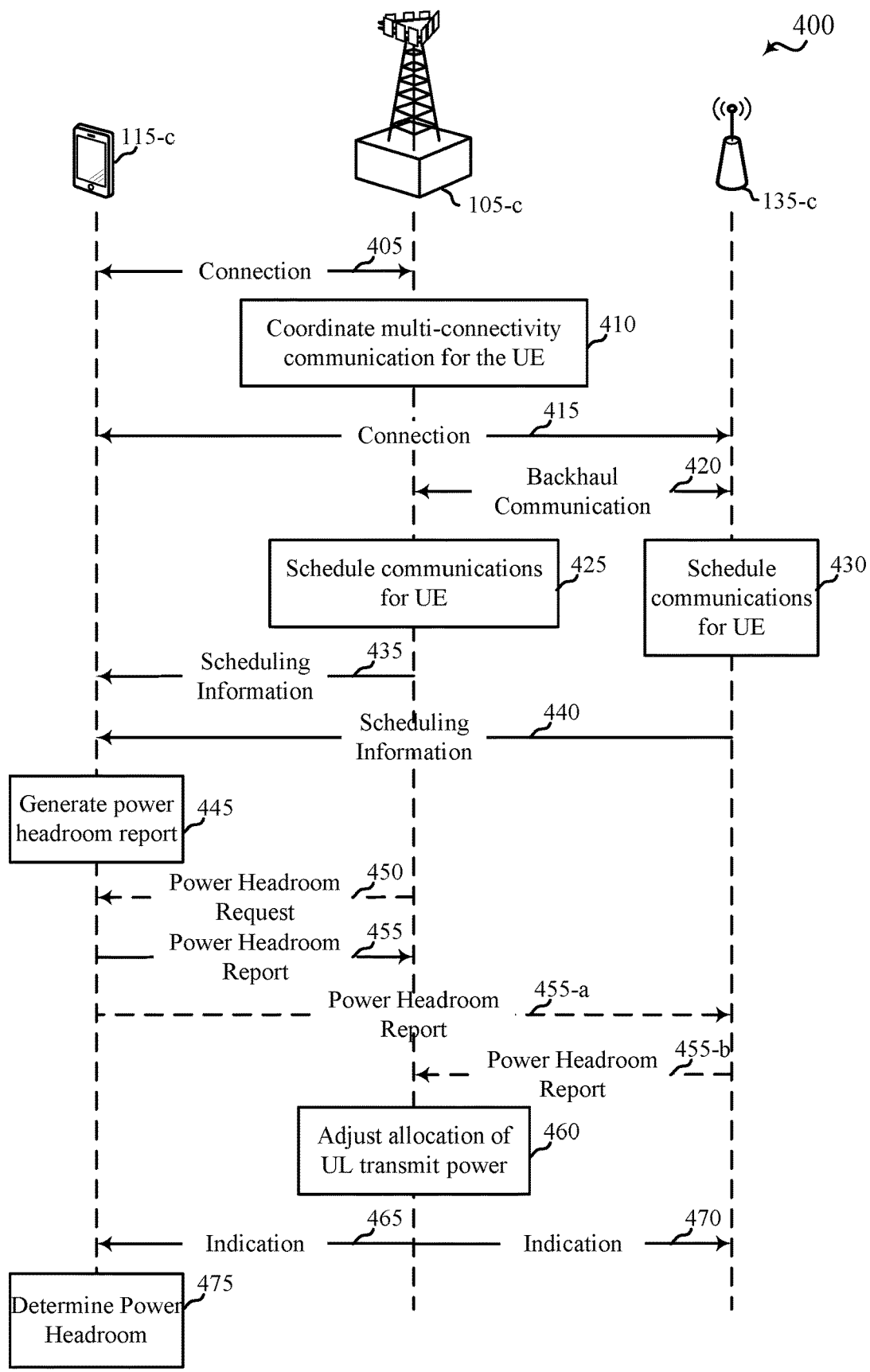
FIG. 4 shows a message flow between a UE, a first eNB, and at least a second eNB, in accordance with various aspects of the present disclosure.

FIG. 4 shows a message flow 400 between a UE 115-*c*, a first eNB 105-*c*, and at least a second eNB 135-*c*, in accordance with various aspects of the present disclosure. Each of the UE 115-*c*, the first eNB 105-*c*, or the second eNB 135-*c* may be an example of aspects of a respective one of the UEs 115, the first eNBs 105, or the second eNBs 135 described with reference to FIG. 1, 2, or 3. In some cases, the first eNB 105-*c* may include a master eNB and the second eNB 135-*c* may include a secondary eNB.

In the following description of the message flow 400, the messages between the UE 115-*c*, the first eNB 105-*c*, or the second eNB 135-*c* may be transmitted in a different order than the exemplary order shown, or the operations performed by the UE 115-*c*, the first eNB 105-*c*, or the second eNB 135-*c* may be performed in different orders or at different times. Certain messages or operations may also be left out of the message flow 400, or other messages or operations may be added to the message flow 400.

The message flow 400 may commence with the UE 115-*c* having established a connection 405 with the first eNB 105-*c* and a connection 415 with the second eNB 135-*c*. Each of the first eNB 105-*c* and the second eNB 135-*c* may provide radio resources to the UE 115-*c* for respective uplink communications. Each of the first eNB 105-*c* and the second eNB 135-*c* may also provide radio resources to the UE 115-*c* for respective downlink communications. The first eNB 105-*c* may be used, at block 410, to coordinate multi-connectivity communication for the UE 115-*c* with the first eNB 105-*c* and the second eNB 135-*c*. To assist the first eNB 105-*c* in coordinating multi-connectivity communication for the UE 115-*c*, the first eNB 105-*c* may transmit or receive backhaul communications 420 with the second eNB 135-*c*. In some embodiments, the first eNB 105-*c* and the second eNB 135-*c* may communicate with the UE 115-*c* using different carriers, and thus, the backhaul communications 420 may be transmitted or received by means of a non-ideal backhaul link (e.g., a backhaul link implementing an X2 interface).

When transmitting uplink communications to the first eNB 105-*c* and the second eNB 135-*c*, the UE 115-*c* may transmit the uplink communications based on an indication of an allocation of uplink transmit power between the first eNB 105-*c* and at least the second eNB 135-*c* for the UE 115-*c*. The indication may be provided to the UE 115-*c* by the first eNB 105-*c*.

At block 425, the first eNB 105-*c* may schedule communications, including uplink communications, between the UE 115-*c* and the first eNB 105-*c*. At block 430, the second eNB 135-*c* may independently schedule communications, including uplink communications, between the UE 115-*c* and the second eNB 135-*c*. Upon receiving the scheduling information 435 or 440, the UE 115-*c* may transmit uplink communications to the first eNB 105-*c* or the second eNB 135-*c* based on the current indication of the allocation of uplink transmit power between the first eNB 105-*c* and at least the second eNB 135-*c* for the UE 115-*c*.

At block 445, the UE 115-*c* may generate a power headroom report for an eNB (e.g., the first eNB 105-*c* or the second eNB 135-*c*). Generation of a power headroom report may be triggered for an eNB (e.g., the first eNB 105-*c* or the second eNB 135-*c*) based on a condition of the eNB or a neighbor eNB (e.g., an eNB other than the eNB for which the power headroom report is triggered). By way of example, the condition of the eNB or the neighbor eNB may be a determination that an uplink transmit power of the UE 115-*c* for the eNB or the neighbor eNB has crossed a threshold. In some cases, the threshold may include a maximum uplink power for the eNB. By way of further example, the condition of the eNB or the neighbor eNB may be a measured pathloss (e.g., a pathloss variation satisfying a threshold) of the eNB or the neighbor eNB. By way of still further example, the condition of the eNB or the neighbor eNB may be a determination that the eNB or the neighbor eNB has activated an uplink cell.

A power headroom report may include power headroom information for both the first eNB 105-*c* and the second eNB 135-*c*. Alternatively, the power headroom information may be for only the eNB 135 that triggered the power headroom report. The inclusion of power headroom information for both the first eNB 105-*c* and the second eNB 135-*c* may reduce power headroom report overhead and enable an eNB to estimate the total uplink transmit power used by the UE 115-*c*. In some examples, the power headroom information may be computed per cell as:

$$PH(cell) = MaxPower(cell) - ActualTxPower(cell), \quad \text{(Equation 1)}$$

where PH(cell) is the power headroom of a cell, MaxPower(cell) is the maximum uplink transmit power of the cell, and ActualTxPower(cell) is the current actual uplink transmit power of the cell.

In some cases, a power headroom report may be automatically transmitted to an eNB for which the power headroom report is triggered. In other cases, a power headroom report may be transmitted to an eNB for which the power headroom report is triggered in response to a triggering message received from the eNB. In the latter cases, and by way of example, a power headroom report 455 triggered for the first eNB 105-*c* may be transmitted to the first eNB 105-*c* in response to a triggering message (e.g., a power headroom request 450) received from the first eNB 105-*c*.

A power headroom report may be transmitted to the first eNB 105-*c* or the second eNB 135-*c*. In some cases, a power headroom report may be transmitted to the eNB for which the power headroom report was triggered (e.g., a power headroom report 455 triggered for the first eNB 105-*c* may be transmitted to the first eNB 105-*c*, as indicated by the transmission of power headroom report 455). In other cases, a power headroom report may be transmitted to the eNB for which the power headroom report was triggered, as well as a neighbor eNB (e.g., a power headroom report 455 triggered for the first eNB 105-*c* may be transmitted to the first eNB 105-*c* and the second eNB 135-*b*, as indicated by the transmission of power headroom report 455 and power headroom report 455-*a*). In the latter cases, the UE 115-*c* may in some cases transmit a power headroom report to a neighbor eNB based on a determination that uplink resources are allocated to the UE 115-*c* for an uplink transmission to the neighbor eNB. In some cases, an eNB for which a power headroom report is triggered may transmit (e.g., relay) a power headroom report to another eNB, as indicated by the transmission of power headroom report 455-*b* from the second eNB 135-*c* to the first eNB 105-*c*. In additional or alternative examples, the first eNB 105-*c* and the second eNB 135-*b* may exchange power headroom reports 135-*b* received from the UE 115-*c* over the backhaul between the first eNB 105-*c* and the second eNB 135-*c*.

At block 460, the first eNB 105-c may adjust the allocation of uplink transmit power between the first eNB 105-c and the second eNB 135-c for the UE 115-c. The allocation may be adjusted based on the power headroom report 455.

Upon making the adjustment at block 460, the first eNB 105-c may transmit an indication 465 of the allocation of uplink transmit power between the first eNB 105-c and at least the second eNB 135-c to the UE 115-c. In some cases, an indication 470 may also be transmitted to the second eNB 135-c. The indication(s) 465, 470 of the allocation of uplink transmit power may in some cases include an indication of a maximum uplink transmit power, or a percentage of uplink transmit power, allocated to each of the first eNB 105-c and at least the second eNB 135-c.

When the first eNB 105-c or the second eNB 135-c operates in a TDD mode, the indication 465 of the allocation of uplink transmit power between the first eNB 105-c and at least the second eNB 135-c may be based at least in part on an UL/DL configuration of the first eNB 105-c or the second eNB 135-c. For example, when an eNB operates in a TDD mode, the number of active uplink carriers can change over time based on the TDD configuration of each cell within the eNB. When the number of active uplink carriers used by an eNB is less during a particular time period, more of the total uplink transmit power available to a UE during the time period may be allocated to another eNB with which the UE may communicate during the time period. Conversely, more of the total uplink transmit power available to the UE during the time period may be allocated to an eNB when the number of active uplink carriers used by the eNB is greater during a particular time period.

The indication 465 of the uplink transmit power between the first eNB 105-c and at least the second eNB 135-c may include an indication of subframes on which substantially all transmit power may be allocated to the first eNB 105-c or to the second eNB 135-c. For example, during a subframe or time period in which no uplink communications to an eNB are expected, substantially all uplink transmit power may be allocated to one or more other eNBs.

In some cases, the indication 465 may include a time index. The time index may be used to indicate the subframes or time periods in which an eNB is allocated a particular uplink transmit power, and may be used to allocate different uplink transmit powers to different eNBs within a subframe or time period.

At block 475, and after receiving the indication 465 of uplink transmit power, the UE 115-c may determine power headroom for the first eNB 105-c and the second eNB 135-c with respect to the uplink transmit power allocated to the first eNB 105-c or the second eNB 135-c in the indication 465 of uplink transmit power.

Figure 5:
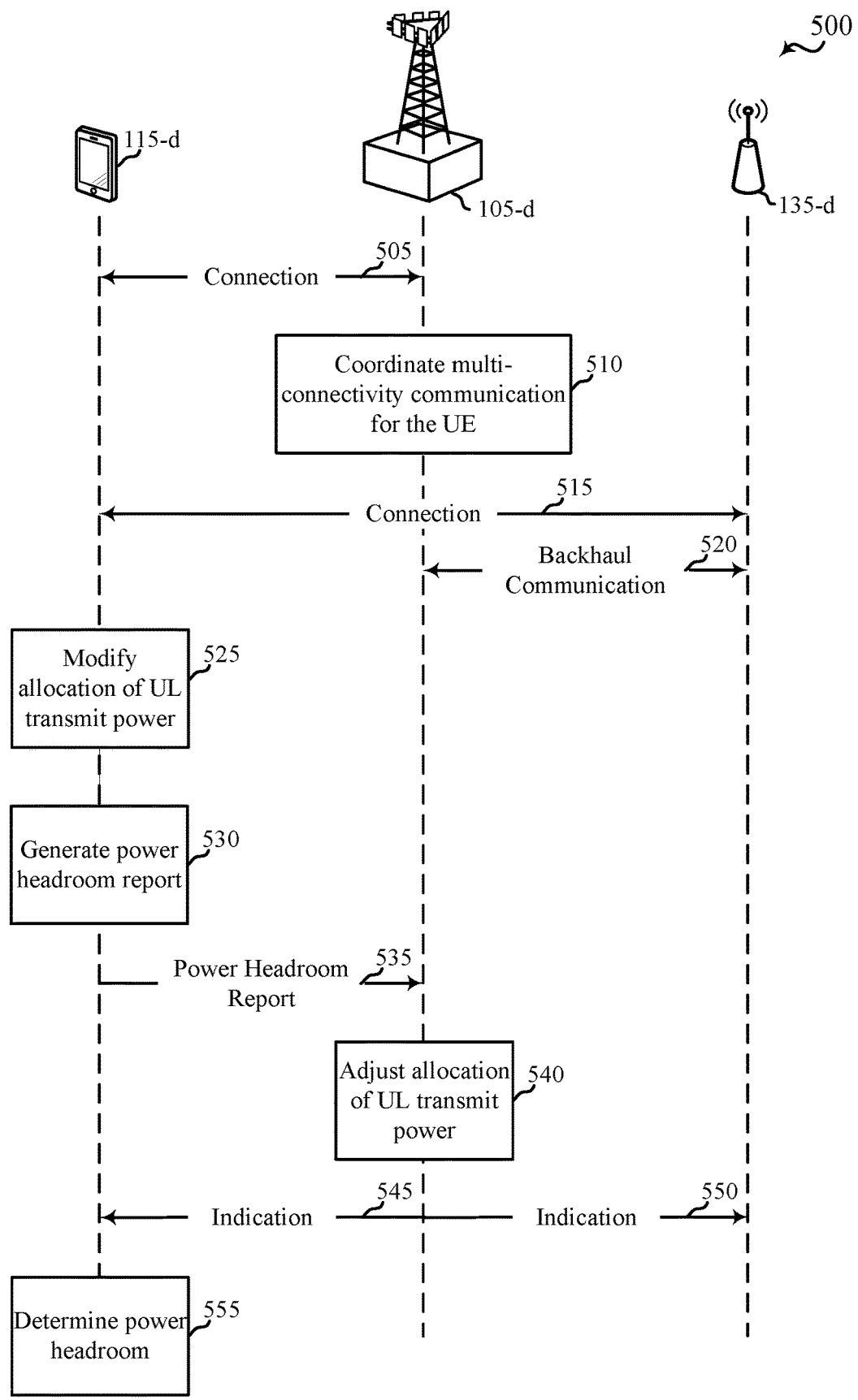
FIG. 5 shows a message flow between a UE, a first eNB, and at least a second eNB, in accordance with various aspects of the present disclosure.

FIG. 5 shows a message flow 500 between a UE 115-d, a first eNB 105-d, and at least a second eNB 135-d, in accordance with various aspects of the present disclosure. Each of the UE 115-d, the first eNB 105-d, or the second eNB 135-d may be an example of aspects of a respective one of the UEs 115, the first eNBs 105, or the second eNBs 135 described with reference to FIG. 1, 2, 3, or 4. In some cases, the first eNB 105-d may include a master eNB and the second eNB 135-d may include a secondary eNB.

In the following description of the message flow 500, the messages between the UE 115-d, the first eNB 105-d, or the second eNB 135-d may be transmitted in a different order than the exemplary order shown, or the operations performed by the UE 115-d, the first eNB 105-d, or the second eNB 135-d may be performed in different orders or at different times. Certain messages or operations may also be left out of the message flow 500, or other messages or operations may be added to the message flow 500.

The message flow 500 may commence with the UE 115-d having established a connection 505 with the first eNB 105-d and a connection 515 with the second eNB 135-d. Each of the first eNB 105-d and the second eNB 135-d may provide radio resources to the UE 115-d for respective uplink communications. Each of the first eNB 105-d and the second eNB 135-d may also provide radio resources to the UE 115-d for respective downlink communications. The first eNB 105-d may be used, at block 510, to coordinate multi-connectivity communication for the UE 115-d with the first eNB 105-d and the second eNB 135-d. To assist the first eNB 105-d in coordinating multi-connectivity communication for the UE 115-d, the first eNB 105-d may transmit or receive communications 520 with the second eNB 135-d. In some embodiments, the first eNB 105-d and the second eNB 135-d may communicate with the UE 115-d using different carriers, and thus, the communications 520 may be transmitted or received by means of a non-ideal backhaul link (e.g., a backhaul link implementing an X2 interface).

When transmitting uplink communications to the first eNB 105-d and the second eNB 135-d, the UE 115-d may transmit the uplink communications based on an indication of an allocation of uplink transmit power between the first eNB 105-d and at least the second eNB 135-d for the UE 115-d. The indication may be provided to the UE 115-d by the first eNB 105-d.

At block 525, the UE 115-d may modify the allocation of uplink transmit power between the first eNB 105-d and the second eNB 135-d (or an allocation of uplink transmit power between cells). In some cases, the UE 115-d may modify the allocation of uplink transmit power by borrowing uplink transmit power allocated to one eNB or cell and re-allocating the borrowed uplink transmit power to another eNB or cell. The modification of the allocation of uplink transmit power may in some cases be based on a priority of uplink data or control information for one of the eNBs (e.g., the first eNB 105-d or the second eNB 135-d) with respect to the other of the eNBs. The modification may also or alternately be based on a priority of uplink data or control information for a cell. The modification may also or alternately be based on non-use of an uplink by an eNB or cell.

At block 530, the generation of a power headroom report may be triggered based on the modification of the allocation of uplink transmit power between the first eNB 105-d and the second eNB 135-d (or between cells of one or more of the first eNB 105-d and the second eNB 135-d). In some cases, the power headroom report may include an indication that an uplink transmit power for one of the first eNB 105-d or the second eNB 135-d has exceeded a maximum transmit power allocated to that eNB.

The power headroom report may include power headroom information for both the first eNB 105-d and the second eNB 135-d. The inclusion of power headroom information for both the first eNB 105-d and the second eNB 135-d may reduce power headroom report overhead and enable an eNB to estimate the total uplink transmit power used by the UE 115-e. In some examples, the power headroom information may be computed using Equation 1.

The power headroom report 535 may be transmitted to the first eNB 105-d or the second eNB 135-d. In some cases, a power headroom report may be transmitted to an eNB that received power during modification of an allocation of uplink transmit power. Such a power headroom report may include negative power headroom information. In other cases, a power headroom report may be transmitted to an eNB from which power was borrowed during modification of an allocation of uplink transmit power. The latter power headroom report may subtract the borrowed power from the configured maximum power for an eNB or cell. In the case of power headroom information per cell, the power headroom information may be computed as:

$$PH(cell)=MaxPower(cell)-ActualTxPower(cell)-BorrowedPower(cell), \quad \text{(Equation 2)}$$

where BorrowedPower(cell) is the power borrowed from the cell.

At block 540, the first eNB 105-*d* may adjust the allocation of uplink transmit power between the first eNB 105-*d* and the second eNB 135-*d* for the UE 115-*d*. The allocation may be adjusted based on the power headroom report 535.

Upon making the adjustment at block 540, the first eNB 105-*d* may transmit an indication 545 of the allocation of uplink transmit power between the first eNB 105-*d* and at least the second eNB 135-*d* to the UE 115-*d*. In some cases, an indication 550 may also be transmitted to the second eNB 135-*d*. The indication(s) 545, 550 of the allocation of uplink transmit power may in some cases include an indication of a maximum uplink transmit power allocated to each of the first eNB 105-*d* and at least the second eNB 135-*d*.

In some embodiments, such as when the first eNB 105-*d* or the second eNB 135-*d* operates in a TDD mode, the indication 545 of uplink transmit power between the first eNB 105-*d* and at least the second eNB 135-*d* may be based at least in part on an UL/DL configuration of the first eNB 105-*d* or the second eNB 135-*d*. For example, when an eNB operates in a TDD mode, the number of active uplink carriers can change over time based on the TDD configuration of each cell within the eNB. When the number of active uplink carriers used by an eNB is less during a particular time period, more of the total uplink transmit power available to the UE 115-*d* during the time period may be allocated to another eNB with which the UE 115-*d* may communicate during the time period. Conversely, more of the total uplink transmit power available to the UE 115-*d* during the time period may be allocated to an eNB when the number of active uplink carriers used by the eNB is greater during a particular time period.

In some embodiments, the indication 545 of the allocation of uplink transmit power between the first eNB 105-*d* and at least the second eNB 135-*d* may include an indication of subframes on which substantially all transmit power may be allocated to the first eNB 105-*d* or to the second eNB 135-*d*. For example, during a subframe or time period in which no uplink communications to an eNB are expected, substantially all uplink transmit power may be allocated to one or more other eNBs.

In some cases, the indication 545 may include a time index. The time index may be used to indicate the subframes or time periods in which an eNB is allocated a particular uplink transmit power, and may be used to allocate different uplink transmit powers to different eNBs within a subframe or time period.

At block 555, and after receiving the indication 545 of uplink transmit power, the UE 115-*d* may determine power headroom for the first eNB 105-*d* and the second eNB 135-*d* with respect to the uplink transmit power allocated to the first eNB 105-*d* or the second eNB 135-*d* in the indication 545 of uplink transmit power.

Figure 6:
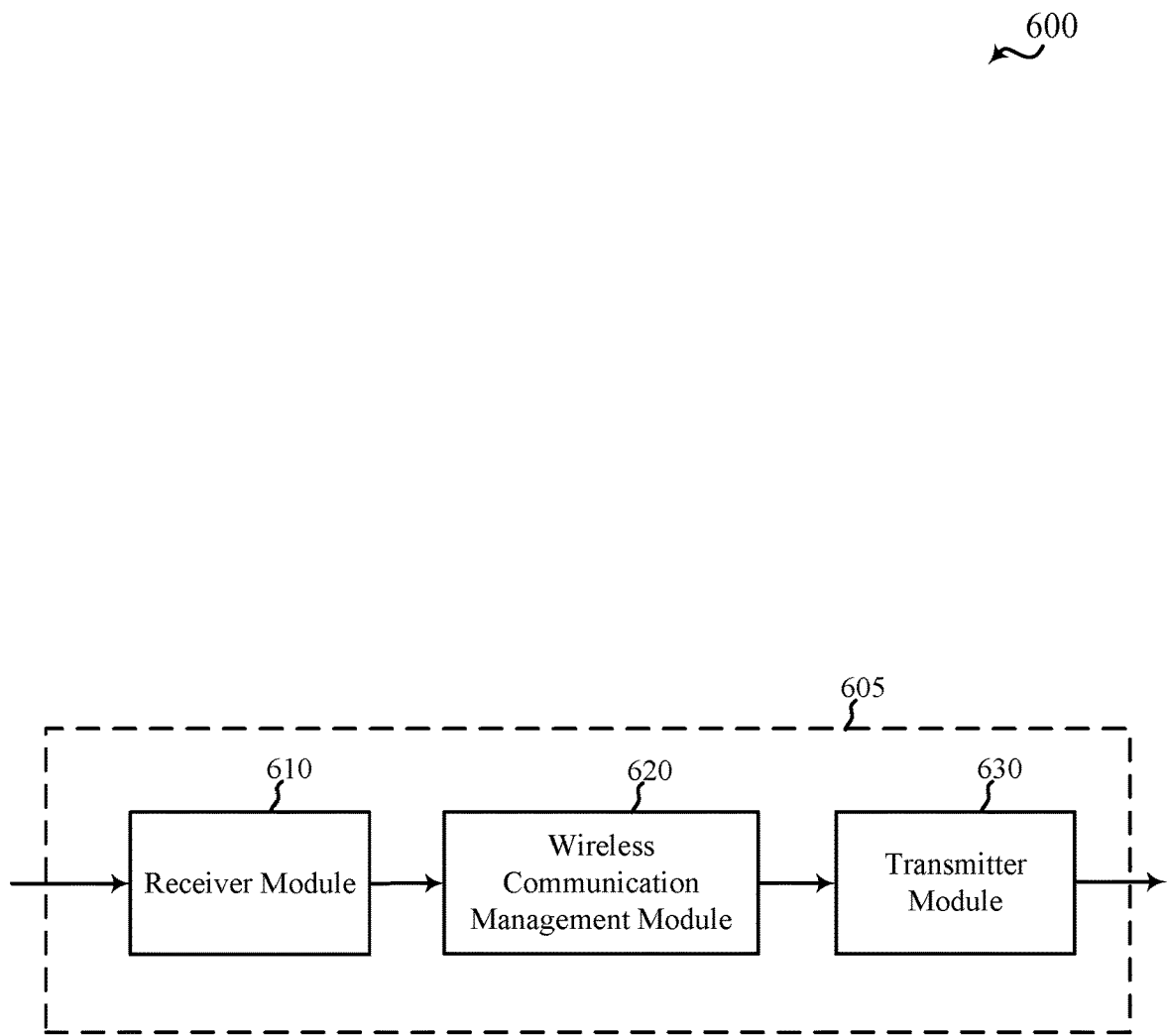
FIG. 6 shows a block diagram of an example of a device usable for wireless communication, in accordance with various aspects of the present disclosure.

Referring now to FIG. 6, a block diagram 600 illustrates an example of a device 605 usable for wireless communication, in accordance with various aspects of the present disclosure. The device 605 may be an example of one or more aspects of one of the UEs 115, first eNBs 105, or second eNBs 135 described with reference to FIG. 1, 2, 3, 4, or 5. The device 605 may also be a processor. The device 605 may include a receiver module 610, a wireless communication management module 620, and a transmitter module 630. Each of these components may be in communication with each other.

The components of the device 605 may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The receiver module 610 may include any number of receivers. In some cases the receiver module 610 may include a cellular receiver. The cellular receiver may in some cases be an LTE/LTE-A receiver. The cellular receiver may be used to receive various types of data or control signals, collectively referred to as transmissions. The transmissions may be received over one or more communication channels of a wireless communications system such as the wireless communication system 100 or 200 described with reference to FIG. 1 or 2. In some cases, the receiver module 610 may include an alternate or additional type of receiver, such as an Ethernet or WLAN receiver. The Ethernet or WLAN receiver may also be used to receive various types of data or control signals, and may also receive transmissions over one or more communication channels of a wireless communications system such as the wireless communication system 100 or 200.

The transmitter module 630 may include any number of transmitters. In some cases the transmitter module 630 may include a cellular transmitter. The cellular transmitter may in some cases be an LTE/LTE-A transmitter. The cellular transmitter may be used to transmit various types of data or control signals, collectively referred to as transmissions. The transmissions may be transmitted over one or more communication channels of a wireless communications system such as the wireless communication system 100 or 200. In some cases, the transmitter module 630 may include an alternate or additional type of transmitter, such as an Ethernet or WLAN transmitter. The Ethernet or WLAN transmitter may also be used to transmit various types of data or control signals, and may also transmit over one or more communication channels of a wireless communications system such as the wireless communication system 100 or 200.

The wireless communication management module 620 may perform various functions. In embodiments of the device 605 in which the device 605 may be configured as a UE 115, the wireless communication management module 620 may be used to manage multi-connectivity communication with a first eNB 105 and at least one second eNB 135. The wireless communication management module 620 may also be used to manage an allocation of uplink transmit power between the first eNB 105 and the at least one second eNB 135.

In embodiments of the device 605 in which the device 605 may be configured as a first eNB 105, the wireless communication management module 620 may be used to manage multi-connectivity communication for a UE 115 communicating with the device 605 and at least one second eNB 135. The wireless communication management module 620 may also be used to allocate uplink transmit power between the device 605 and the at least one second eNB 135.

In embodiments of the device 605 in which the device 605 may be configured as a second eNB 135, the wireless communication management module 620 may be used to manage multi-connectivity communication for a UE 115 communicating with a first eNB 105, the device 605, and possibly one or more other second eNBs 135. The wireless communication management module 620 may also be used to facilitate an allocation of uplink transmit power between the first eNB 105, the device 605, and possibly one or more other second eNBs 135.

Figure 7:
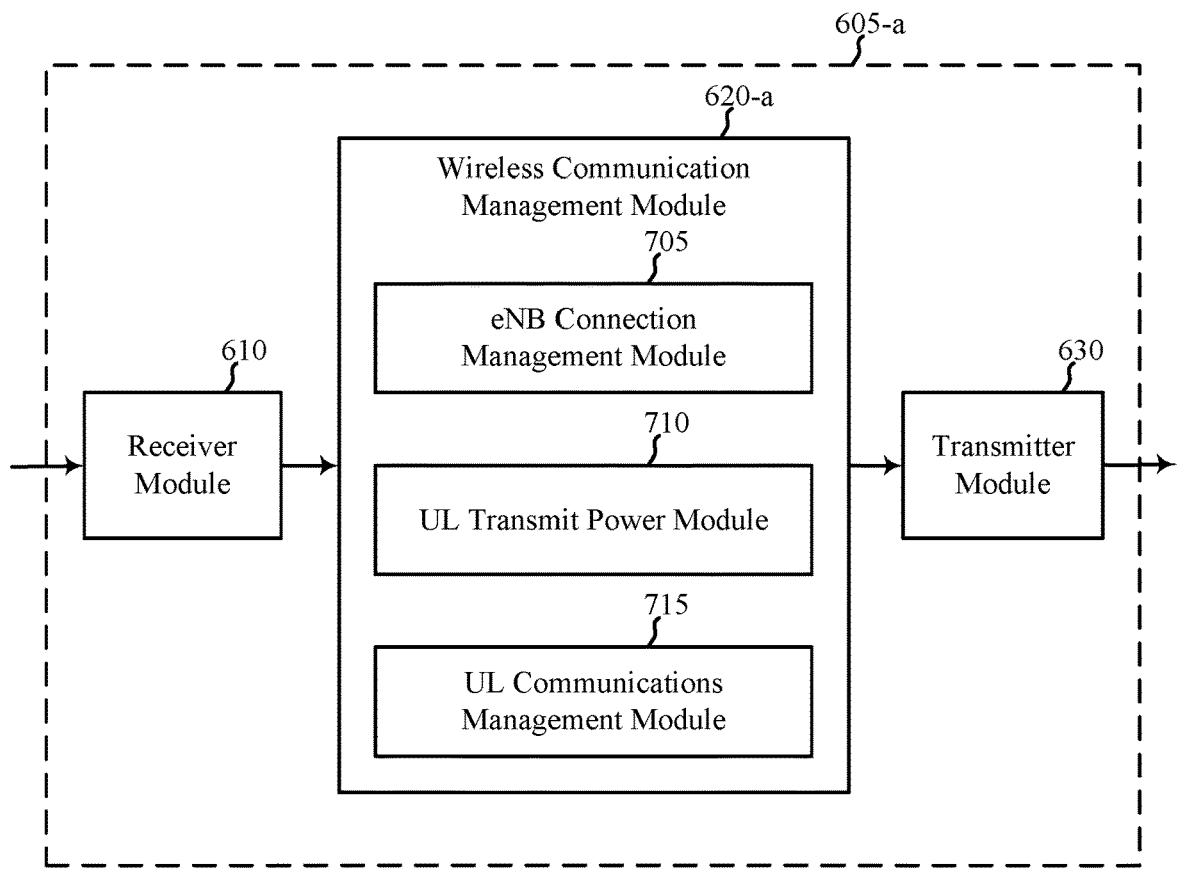
FIG. 7 shows a block diagram of an example of a device usable for wireless communication, in accordance with various aspects of the present disclosure.

Referring now to FIG. 7, a block diagram 700 illustrates an example of a device 605-*a* usable for wireless communication, in accordance with various aspects of the present disclosure. The device 605-*a* may be an example of one or more aspects of one of the UEs 115 or the device 605 configured as a UE, as described with reference to FIG. 1, 2, 3, 4, 5, or 6. The device 605-*a* may also be a processor. The device 605-*a* may include a receiver module 610, a wireless communication management module 620-*a*, or a transmitter module 630. Each of these components may be in communication with each other.

The components of the device 605-*a* may, individually or collectively, be implemented with one or more ASICs adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

The receiver module 610 may be configured similarly to the receiver module 610 described with reference to FIG. 6. Similarly, the transmitter module 630 may be configured similarly to the transmitter module 630 described with reference to FIG. 6.

The wireless communication management module 620-*a* may be an example of the wireless communication management module 620 described with reference to FIG. 6 and may include an eNB connection management module 705, an uplink transmit power management module 710, and an uplink communications management module 715.

The eNB connection management module 705 may be used to establish a connection with a first eNB and a second eNB. Each of the first eNB and the second eNB may provide radio resources to the UE for respective uplink communications. Each of the first eNB and the second eNB may also provide radio resources to the UE 115-*b* for respective downlink communications. In some cases, the first eNB may be an example of one or more aspects of one of the first eNBs 105 or the device 605 configured as a first eNB, as described with reference to FIG. 1, 2, 3, 4, 5, or 6. In some cases, the second eNB may be an example of one or more aspects of one of the second eNBs 135 or the device 605 configured as a second eNB, as described with reference to FIG. 1, 2, 3, 4, 5, or 6. In some cases, the first eNB may include a master eNB and the second eNB may include a secondary eNB.

The uplink transmit power management module 710 may be used to receive from the first eNB, at the device 605-*a*, an indication including an allocation of uplink transmit power between the first eNB and at least the second eNB. The uplink transmit power may in some cases be a maximum uplink transmit power.

When the first eNB or the second eNB operates in a TDD mode, the indication including the allocation of uplink transmit power between the first eNB and at least the second eNB may be based at least in part on an UL/DL configuration of the first eNB or the second eNB. For example, when an eNB operates in a TDD mode, the number of active uplink carriers can change over time based on the TDD configuration of each cell within the eNB. When the number of active uplink carriers used by an eNB is less during a particular time period, more of the total uplink transmit power available to a UE during the time period may be allocated to another eNB with which the UE may communicate during the time period. Conversely, more of the total uplink transmit power available to the UE during the time period may be allocated to an eNB when the number of active uplink carriers used by the eNB is greater during a particular time period.

In some examples, the indication including the allocation of uplink transmit power between the first eNB and at least the second eNB may include an indication of subframes on which substantially all transmit power may be allocated to the first eNB or to the second eNB. For example, during a subframe or time period in which no uplink communications to an eNB are expected, substantially all uplink transmit power may be allocated to one or more other eNBs.

In some cases, the indication may include a time index. The time index may be used to indicate the subframes or time periods in which an eNB is allocated a particular uplink transmit power, and may be used to allocate different uplink transmit powers to different eNBs within a subframe or time period.

In some examples, the uplink transmit power management module 710 may determine an allocation of uplink transmit power between a plurality of cells of the first eNB or the second eNB based on the indication including the allocation of uplink transmit power between the first eNB and at least the second eNB. The allocation of uplink transmit power between the plurality of cells may in some cases be semi-statically specified in the indication (e.g., the first eNB may specify or configure an uplink transmit power value for each cell, which uplink transmit power value may be used by the UE until the UE receives, from the first eNB, an adjusted indication including an allocation of uplink transmit power between the first eNB and at least the second eNB). The allocation of uplink transmit power between the plurality of cells may in other cases be semi-statically specified per time index in the indication (e.g., the first eNB may specify or configure multiple uplink transmit power values for each cell, for each time index, which uplink transmit power values may be used by the UE until the UE receives, from the first eNB, an adjusted indication including an allocation of uplink transmit power between the first eNB and at least the second eNB).

In some examples, the indication including an allocation of uplink transmit power between the first eNB and at least the second eNB may include an allocation of total transmit power, or a percentage of transmit power, between communications with the first eNB and the second eNB. In these embodiments, the uplink transmit power management module 710 may determine an uplink transmit power for each of a plurality of cells controlled by the first eNB or the second eNB based on the indication including the allocation of uplink transmit power between the first eNB and at least the second eNB. In some cases, the uplink transmit power per cell (e.g., the maximum uplink transmit power per cell) may be dynamically adjusted by the uplink transmit power management module 710.

The uplink communications management module 715 may be used to transmit the uplink communications from the device 605-a to the first eNB and the second eNB based on the indication including an allocation of uplink transmit power between the first eNB and at least the second eNB.

Figure 8:
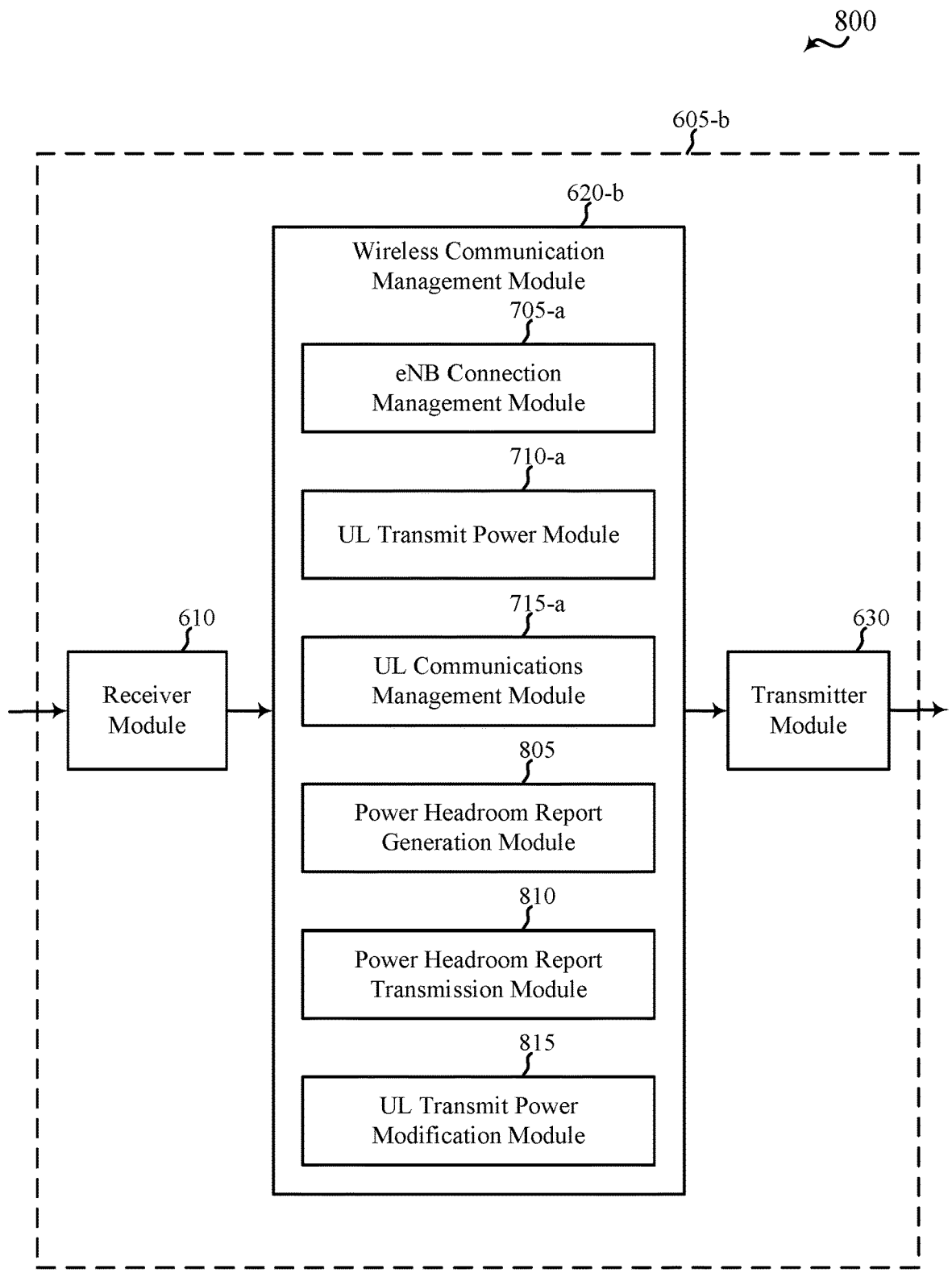
FIG. 8 shows a block diagram of an example of a device usable for wireless communication, in accordance with various aspects of the present disclosure.

Referring now to FIG. 8, a block diagram 800 illustrates an example of a device 605-b usable for wireless communication, in accordance with various aspects of the present disclosure. The device 605-b may be an example of one or more aspects of one of the UEs 115 or the device 605 configured as a UE, as described with reference to FIG. 1, 2, 3, 4, 5, 6, or 7. The device 605-b may also be a processor. The device 605-b may include a receiver module 610, a wireless communication management module 620-b, and a transmitter module 630. Each of these components may be in communication with each other.

The components of the device 605-b may, individually or collectively, be implemented with one or more ASICs adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

The receiver module 610 may be configured similarly to the receiver module 610 described with reference to FIG. 6. Similarly, the transmitter module 630 may be configured similarly to the transmitter module 630 described with reference to FIG. 6.

The wireless communication management module 620-b may be an example of the wireless communication management module 620 described with reference to FIG. 6 or 7 and may include an eNB connection management module 705-a, an uplink transmit power management module 710-a, an uplink communications management module 715-a, a power headroom report generation module 805, a power headroom report transmission module 810, and an uplink transmit power modification module 815.

The eNB connection management module 705-a may be used to establish a connection with a first eNB and a second eNB. Each of the first eNB and the second eNB may provide radio resources to the UE for respective uplink communications. Each of the first eNB and the second eNB may also provide radio resources to the UE 115-b for respective downlink communications. In some cases, the first eNB may be an example of one or more aspects of one of the first eNBs 105 or the device 605 configured as a first eNB, as described with reference to FIG. 1, 2, 3, 4, 5, or 6. In some cases, the second eNB may be an example of one or more aspects of one of the second eNBs 135 or the device 605 configured as a second eNB, as described with reference to FIG. 1, 2, 3, 4, 5, or 6. In some cases, the first eNB may include a master eNB and the second eNB may include a secondary eNB.

The uplink transmit power management module 710-a may be used to receive from the first eNB, at the device 605-b, an indication including an allocation of uplink transmit power between the first eNB and at least the second eNB. The uplink transmit power may in some cases be a maximum uplink transmit power.

In some embodiments, such as when the first eNB or the second eNB operates in a TDD mode, the indication including an allocation of uplink transmit power between the first eNB and at least the second eNB may be based at least in part on an UL/DL configuration of the first eNB or the second eNB. For example, when an eNB operates in a TDD mode, the number of active uplink carriers can change over time based on the TDD configuration of each cell within the eNB. When the number of active uplink carriers used by an eNB is less during a particular time period, more of the total uplink transmit power available to a UE during the time period may be allocated to another eNB with which the UE may communicate during the time period. Conversely, more of the total uplink transmit power available to the UE during the time period may be allocated to an eNB when the number of active uplink carriers used by the eNB is greater during a particular time period.

In some embodiments, the indication including the allocation of uplink transmit power between the first eNB and at least the second eNB may include an indication of subframes on which substantially all transmit power may be allocated to the first eNB or to the second eNB. For example, during a subframe or time period in which no uplink communications to an eNB are expected, substantially all uplink transmit power may be allocated to one or more other eNBs.

In some cases, the indication may include a time index. The time index may be used to indicate the subframes or time periods in which an eNB is allocated a particular uplink transmit power, and may be used to allocate different uplink transmit powers to different eNBs within a subframe or time period.

In some embodiments, the uplink transmit power management module 710-a may determine an allocation of uplink transmit power between a plurality of cells of the first eNB or the second eNB based on the indication including the allocation of uplink transmit power between the first eNB and at least the second eNB. The allocation of uplink transmit power between the plurality of cells may in some cases be semi-statically specified in the indication (e.g., the first eNB may specify or configure an uplink transmit power value for each cell, which uplink transmit power value may be used by the UE until the UE receives, from the first eNB, an adjusted indication including an allocation of uplink transmit power between the first eNB and at least the second eNB). The allocation of uplink transmit power between the plurality of cells may in other cases be semi-statically specified per time index in the indication (e.g., the first eNB may specify or configure multiple uplink transmit power values for each cell, for each time index, which uplink transmit power values may be used by the UE until the UE receives, from the first eNB, an adjusted indication including an allocation of uplink transmit power between the first eNB and at least the second eNB).

In some embodiments, the indication including an allocation of uplink transmit power between the first eNB and at least the second eNB may include an allocation of total transmit power, or a percentage of total transmit power, between communications with the first eNB and the second eNB. In these embodiments, the uplink transmit power management module 710-a may determine an uplink transmit power for each of a plurality of cells controlled by the first eNB or the second eNB based on the indication including the allocation of uplink transmit power between the first eNB and at least the second eNB. In some cases, the uplink transmit power per cell (e.g., the maximum uplink transmit power per cell) may be dynamically adjusted by the uplink transmit power management module 710-*a*.

The uplink communications management module 715-*a* may be used to transmit the uplink communications from the device 605-*b* to the first eNB and the second eNB based on the indication including an allocation of uplink transmit power between the first eNB and at least the second eNB.

The power headroom report generation module 805 may be used to trigger a power headroom report at the device 605-*b*. In some embodiments, the power headroom report generation module 805 may trigger a power headroom report for an eNB (e.g., the first eNB or the second eNB) based on a condition of the eNB or a neighbor eNB (e.g., an eNB other than the eNB for which the power headroom report is triggered). By way of example, the condition of the eNB or the neighbor eNB may be a determination that an uplink transmit power of the device 605-*b* for the eNB or the neighbor eNB has crossed a threshold. In some cases, the threshold may include a maximum uplink power for the eNB. By way of further example, the condition of the eNB or the neighbor eNB may be a measured pathloss (e.g., a pathloss variation satisfying a threshold) of the eNB or the neighbor eNB. By way of still further example, the condition of the eNB or the neighbor eNB may be a determination that the eNB or the neighbor eNB has activated an uplink cell.

The power headroom report generation module 805 may also be used to generate a power headroom report at the device 605-*b*. The power headroom report may include power headroom information for both the first eNB and the second eNB. The inclusion of power headroom information for both the first eNB and the second eNB may reduce power headroom report overhead and enable an eNB to estimate the total uplink transmit power used by the device 605-*b*. In some examples, the power headroom information may be computed using Equation 1.

The power headroom report transmission module 810 may be used to transmit a power headroom report to the first eNB or the second eNB. In some embodiments, a power headroom report may be automatically transmitted to an eNB for which the power headroom report is triggered. In other embodiments, a power headroom report may be transmitted to an eNB for which the power headroom report is triggered in response to a triggering message received from the eNB. In the latter embodiments, and by way of example, a power headroom report triggered for the first eNB may be transmitted to the first eNB in response to a triggering message received from the first eNB.

In some cases, the power headroom report transmission module 810 may transmit a power headroom report to the eNB for which the power headroom report was triggered (e.g., a power headroom report triggered for the first eNB may be transmitted to the first eNB). In other cases, the power headroom report transmission module 810 may transmit a power headroom report to the eNB for which the power headroom report was triggered, as well as a neighbor eNB (e.g., a power headroom report triggered for the first eNB may be transmitted to the first eNB and the second eNB). In the latter cases, the power headroom report transmission module 810 may in some cases transmit a power headroom report to a neighbor eNB based on a determination that uplink resources are allocated to the UE for an uplink transmission to the neighbor eNB.

After the power headroom report transmission module 810 transmits a power headroom report to an eNB, the uplink transmit power management module 710-*a* may be used to receive a second indication including an allocation of uplink transmit power from the first eNB. The second indication including an allocation of uplink transmit power may change the uplink transmit power allocated to the first eNB or the second eNB. After receiving the second indication including an allocation of uplink transmit power, the power headroom report generation module 805 may be used to determine power headroom for the first eNB and the second eNB with respect to the uplink transmit power allocated to the first eNB or the second eNB in the second indication.

The uplink transmit power modification module 815 may be used to modify an allocation of total uplink transmit power between the first eNB and the second eNB (or an allocation of uplink transmit power between cells), when possible and useful to transmit uplink communications from the UE to the first eNB or the second eNB. In some cases, the uplink transmit power modification module 815 may modify an allocation of uplink transmit power by borrowing uplink transmit power allocated to one eNB or cell and re-allocating the borrowed uplink transmit power to another eNB or cell. The modification of the allocation of uplink transmit power may in some cases be based on a priority of uplink data or control information for one of the eNBs (e.g., the first eNB or the second eNB) with respect to the other of the eNBs. The modification may also or alternately be based on a priority of uplink data or control information for a cell. The modification may also or alternately be based on non-use of an uplink by an eNB or cell.

Following modification of the allocation of uplink transmit power between the first eNB and the second eNB, a power headroom report may be generated using the power headroom report generation module 805. The power headroom report may include power headroom information for both the first eNB and the second eNB. The inclusion of power headroom information for both the first eNB and the second eNB may reduce power headroom report overhead and enable an eNB to estimate the total uplink transmit power used by the device 605-*b*. In some examples, the power headroom information may be computed using Equation 1.

The power headroom report triggered by modification of the allocation of uplink transmit power between the first eNB and the second eNB may be transmitted to the first eNB or the second eNB. In some cases, the power headroom report transmission module 810 may transmit a power headroom report to an eNB that received power during modification of an allocation of uplink transmit power. Such a power headroom report may include negative power headroom information. In other cases, the power headroom report transmission module 810 may transmit a power headroom report to an eNB from which power was borrowed during modification of an allocation of uplink transmit power. The latter power headroom report may subtract the borrowed power from the configured maximum power for an eNB or cell. In the case of power headroom information per cell, the power headroom information may be computed using Equation 2.

Figure 9:
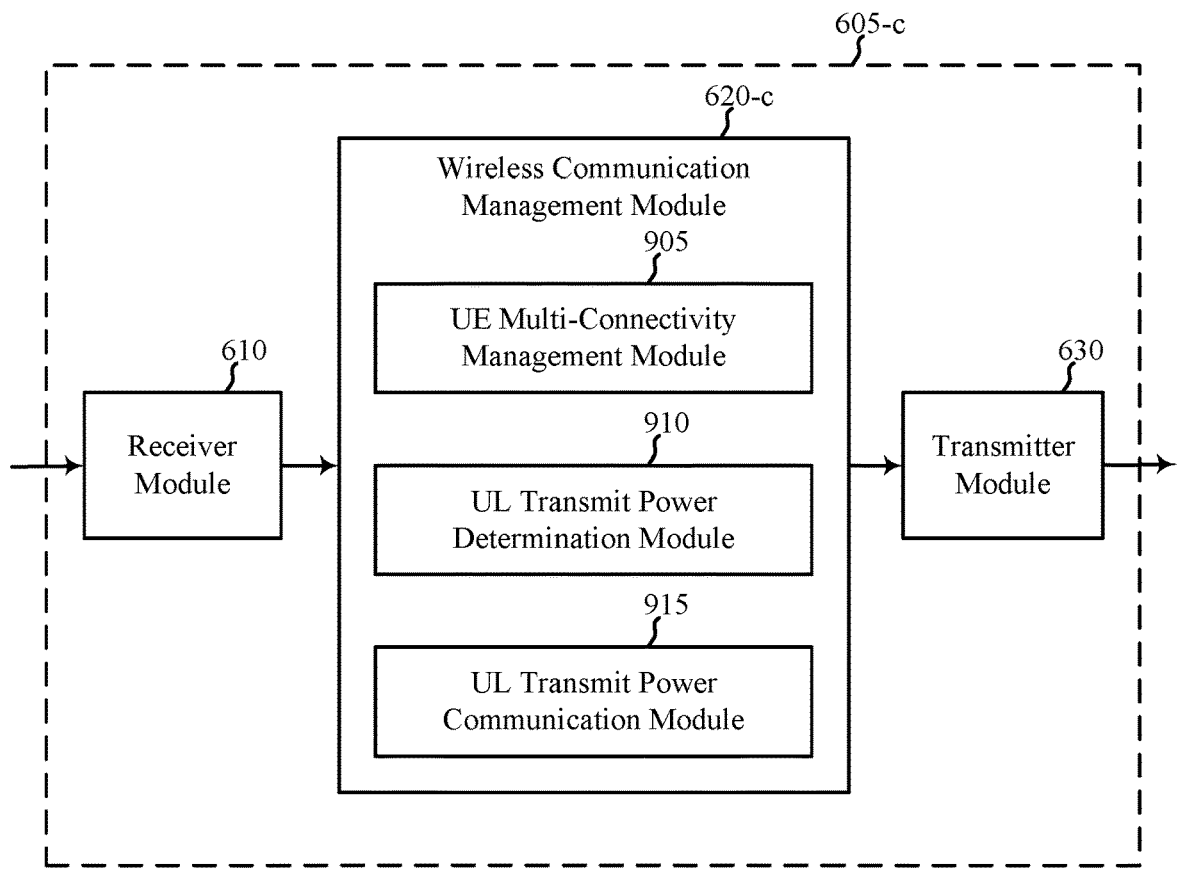
FIG. 9 shows a block diagram of an example of a device usable for wireless communication, in accordance with various aspects of the present disclosure.

Referring now to FIG. 9, a block diagram 900 illustrates an example of a device 605-*c* usable for wireless communication, in accordance with various aspects of the present disclosure. The device 605-*c* may be an example of one or more aspects of one of the first eNBs 105 or the device 605 configured as a first eNB, as described with reference to FIG. 1, 2, 3, 4, 5, or 6. The device 605-*c* may also be a processor. The device 605-*c* may include a receiver module 610, a wireless communication management module 620-c, and a transmitter module 630. Each of these components may be in communication with each other.

The components of the device 605-c may, individually or collectively, be implemented with one or more ASICs adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

The receiver module 610 may be configured similarly to the receiver module 610 described with reference to FIG. 6. Similarly, the transmitter module 630 may be configured similarly to the transmitter module 630 described with reference to FIG. 6.

The wireless communication management module 620-c may be an example of the wireless communication management module 620 described with reference to FIG. 6 and may include a UE multi-connectivity management module 905, an uplink transmit power determination module 910, and an uplink transmit power communication module 915.

The UE multi-connectivity management module 905 may be used to coordinate, for a UE, multi-connectivity communication with at least the device 605-c and a second eNB. In some cases, the UE may be an example of one or more aspects of one of the UEs 115 or the device 605 configured as a UE, as described with reference to FIG. 1, 2, 3, 4, 5, 6, 7, or 8. In some cases, the second eNB may be an example of one or more aspects of one of the second eNBs 135 or the device 605 configured as a second eNB, as described with reference to FIG. 1, 2, 3, 4, 5, or 6. In some cases, the device 605-c may include a master eNB and the second eNB may include a secondary eNB.

The uplink transmit power determination module 910 may be used to determine, for the UE, an allocation of uplink transmit power between the device 605-c and at least the second eNB. The uplink transmit power may in some cases be a maximum uplink transmit power.

In some examples, the uplink transmit power determination module 910 may determine an allocation of uplink transmit power between a plurality of cells of the device 605-c based on the indication including the allocation of uplink transmit power between the device 605-c and at least the second eNB. The allocation of uplink transmit power between the plurality of cells may in some cases be semi-statically specified in the indication (e.g., the device 605-c may specify or configure an uplink transmit power value for each cell, which uplink transmit power value may be used by the UE until the UE receives, from the device 605-c, an adjusted indication including an allocation of uplink transmit power between the device 605-c and at least the second eNB). The allocation of uplink transmit power between the plurality of cells may in other cases be semi-statically specified per time index in the indication (e.g., the device 605-c may specify or configure multiple uplink transmit power values for each cell, for each time index, which uplink transmit power values may be used by the UE until the UE receives, from the device 605-c, an adjusted indication including an allocation of uplink transmit power between the device 605-c and at least the second eNB).

The uplink transmit power communication module 915 may be used to transmit an indication including the allocation of uplink transmit power allocation to the UE.

In some examples, such as when the device 605-c or the second eNB operates in a TDD mode, the indication including the allocation of uplink transmit power between the device 605-c and at least the second eNB may be based at least in part on an UL/DL configuration of the device 605-c or the second eNB. For example, when an eNB operates in a TDD mode, the number of active uplink carriers can change over time based on the TDD configuration of each cell within the eNB. When the number of active uplink carriers used by an eNB is less during a particular time period, more of the total uplink transmit power available to a UE during the time period may be allocated to another eNB with which the UE may communicate during the time period. Conversely, more of the total uplink transmit power available to the UE during the time period may be allocated to an eNB when the number of active uplink carriers used by the eNB is greater during a particular time period.

In some examples, the indication including the allocation of uplink transmit power between the device 605-c and at least the second eNB may include an indication of subframes on which substantially all transmit power may be allocated to the device 605-c or to the second eNB. For example, during a subframe or time period in which no uplink communications to an eNB are expected, substantially all uplink transmit power may be allocated to one or more other eNBs.

In some cases, the indication may include a time index. The time index may be used to indicate the subframes or time periods in which an eNB is allocated a particular uplink transmit power, and may be used to allocate different uplink transmit powers to different eNBs within a subframe or time period.

Figure 10:
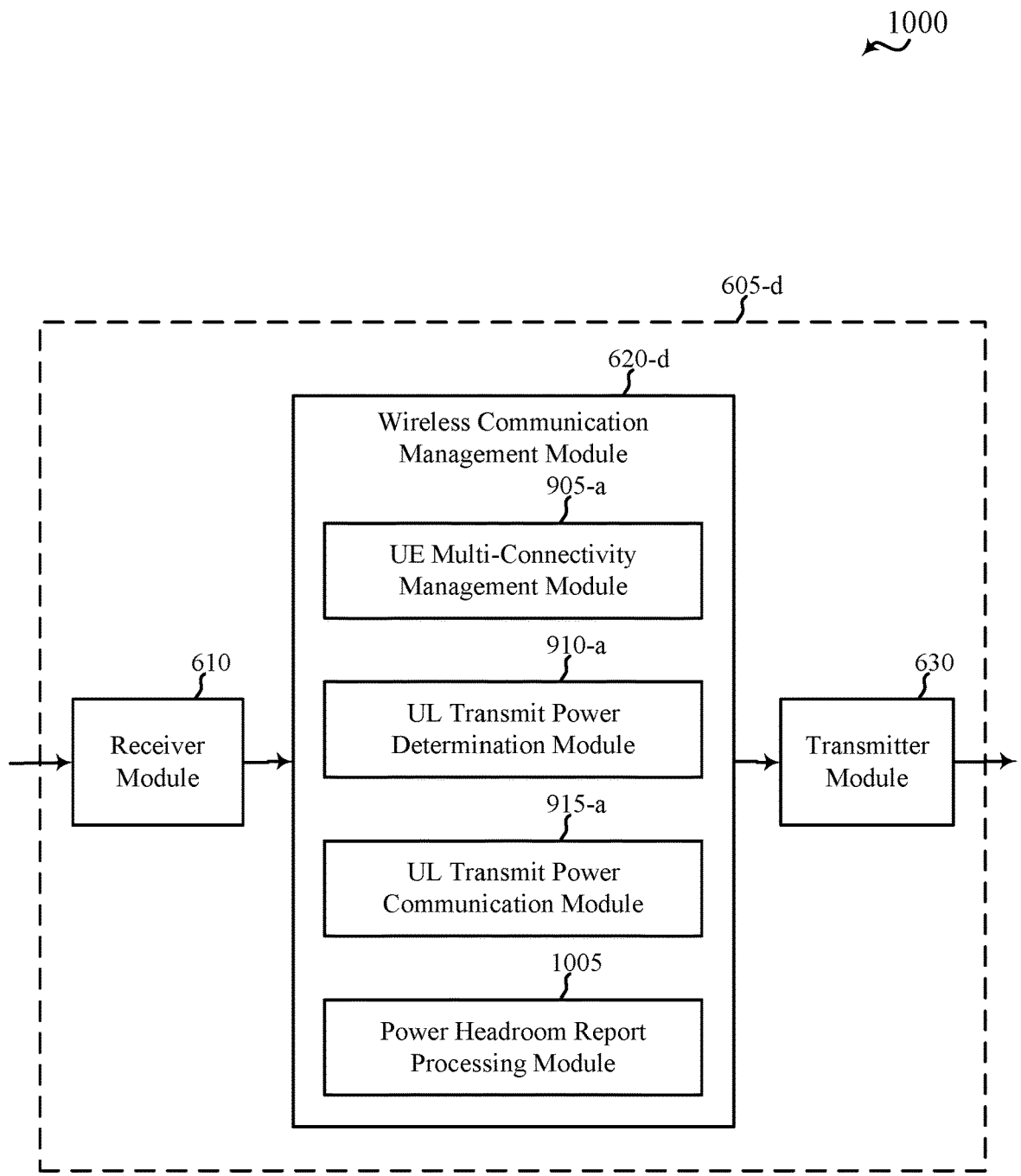
FIG. 10 shows a block diagram of an example of a device usable for wireless communication, in accordance with various aspects of the present disclosure.

Referring now to FIG. 10, a block diagram 1000 illustrates an example of a device 605-d usable for wireless communication, in accordance with various aspects of the present disclosure. The device 605-d may be an example of one or more aspects of one of the first eNBs 105 or the device 605 configured as a first eNB, as described with reference to FIG. 1, 2, 3, 4, 5, or 6. The device 605-d may also be a processor. The device 605-d may include a receiver module 610, a wireless communication management module 620-d, and a transmitter module 630. Each of these components may be in communication with each other.

The components of the device 605-d may, individually or collectively, be implemented with one or more ASICs adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

The receiver module 610 may be configured similarly to the receiver module 610 described with reference to FIG. 6. Similarly, the transmitter module 630 may be configured similarly to the transmitter module 630 described with reference to FIG. 6.

The wireless communication management module 620-d may be an example of the wireless communication management module 620 described with reference to FIG. 6 and may include a UE multi-connectivity management module 905-*a*, an uplink transmit power determination module 910-*a*, an uplink transmit power communication module 915-*a*, and a power headroom report processing module 1005.

The UE multi-connectivity management module 905-*a* may be used to coordinate, for a UE, multi-connectivity communication with at least the device 605-*d* and a second eNB. In some cases, the UE may be an example of one or more aspects of one of the UEs 115 or the device 605 configured as a UE, as described with reference to FIG. 1, 2, 3, 4, 5, 6, 7, or 8. In some cases, the second eNB may be an example of one or more aspects of one of the second eNBs 135 or the device 605 configured as a second eNB, as described with reference to FIG. 1, 2, 3, 4, 5, or 6. In some cases, the device 605-*d* may include a master eNB and the second eNB may include a secondary eNB.

The uplink transmit power determination module 910-*a* may be used to determine, for the UE, an allocation of uplink transmit power between the device 605-*d* and at least the second eNB. The uplink transmit power may in some cases be a maximum uplink transmit power.

In some embodiments, the uplink transmit power determination module 910-*a* may determine an allocation of uplink transmit power between a plurality of cells of the device 605-*d* based on the indication including the allocation of uplink transmit power between the device 605-*d* and at least the second eNB. The allocation of uplink transmit power between the plurality of cells may in some cases be semi-statically specified in the indication (e.g., the device 605-*d* may specify or configure an uplink transmit power value for each cell, which uplink transmit power value may be used by the UE until the UE receives, from the device 605-*d*, an adjusted indication including an allocation of uplink transmit power between the device 605-*d* and at least the second eNB). The allocation of uplink transmit power between the plurality of cells may in other cases be semi-statically specified per time index in the indication (e.g., the device 605-*d* may specify or configure multiple uplink transmit power values for each cell, for each time index, which uplink transmit power values may be used by the UE until the UE receives, from the device 605-*d*, an adjusted indication including an allocation of uplink transmit power between the device 605-*d* and at least the second eNB).

The uplink transmit power communication module 915-*a* may be used to transmit an indication including the allocation of uplink transmit power allocation to the UE.

In some embodiments, such as when the device 605-*d* or the second eNB operates in a TDD mode, the indication including the allocation of uplink transmit power between the device 605-*d* and at least the second eNB may be based at least in part on an UL/DL configuration of the device 605-*d* or the second eNB. For example, when an eNB operates in a TDD mode, the number of active uplink carriers can change over time based on the TDD configuration of each cell within the eNB. When the number of active uplink carriers used by an eNB is less during a particular time period, more of the total uplink transmit power available to a UE during the time period may be allocated to another eNB with which the UE may communicate during the time period. Conversely, more of the total uplink transmit power available to the UE during the time period may be allocated to an eNB when the number of active uplink carriers used by the eNB is greater during a particular time period.

In some embodiments, the indication including the allocation of uplink transmit power between the device 605-*d* and at least the second eNB may include an indication of subframes on which substantially all transmit power may be allocated to the device 605-*d* or to the second eNB. For example, during a subframe or time period in which no uplink communications to an eNB are expected, substantially all uplink transmit power may be allocated to one or more other eNBs.

In some cases, the indication may include a time index. The time index may be used to indicate the subframes or time periods in which an eNB is allocated a particular uplink transmit power, and may be used to allocate different uplink transmit powers to different eNBs within a subframe or time period.

The power headroom report processing module 1005 may be used to receive a power headroom report including power headroom information for at least the device 605-*d* and the second eNB. In some cases, the power headroom report may be received in response to at least one of: an uplink transmit power of the UE for the second eNB, a measured pathloss variation for the second eNB, or the second eNB activating an uplink cell, as described with reference to the power headroom report generation module 805 described with reference to FIG. 8. In some cases, the power headroom report may be received in response to the device 605-*b* sending a triggering message (e.g., a request for a power headroom report) to the UE.

The power headroom report processing module 1005 may optionally transmit the power headroom report to the second eNB.

In some embodiments, a power headroom report may indicate that the UE has modified the allocation of uplink transmit power between the device 605-*d* and the second eNB, and the power headroom report processing module 1005 may be used to determine, based on the power headroom report, that the UE has modified the allocation of uplink transmit power between the device 605-*d* and the second eNB. In other embodiments, the power headroom report may not indicate that the UE has modified the allocation of uplink transmit power between the device 605-*d* and the second eNB.

In some cases, the UL transmit power determination module 910-*a* may be used to adjust the allocation of uplink transmit power between the device 605-*d* and the second eNB for the UE based on the power headroom report. In some cases, the adjustment may be based on a modification by the UE to the allocation of uplink transmit power between the first eNB and the second eNB. In some cases, the UL transmit power communication module 915-*a* may be used to transmit the adjusted allocation of uplink transmit power to at least one of the UE or the second eNB.

In some embodiments of the device 605-*d*, an adjustment of the allocation of uplink transmit power between the device 605-*d* and the second eNB for the UE may also or alternately be made based on a message received at the device 605-*d* from the second eNB. The message may include the power headroom report of the UE or information generated by the second eNB.

In some embodiments of the device 605-*d*, the wireless communication management module 620-*d* may schedule communications (e.g., downlink or uplink communications) with the UE. The communications between the UE and the device 605-*d* may be scheduled independently from communications between the UE and the second eNB.

Figure 11:
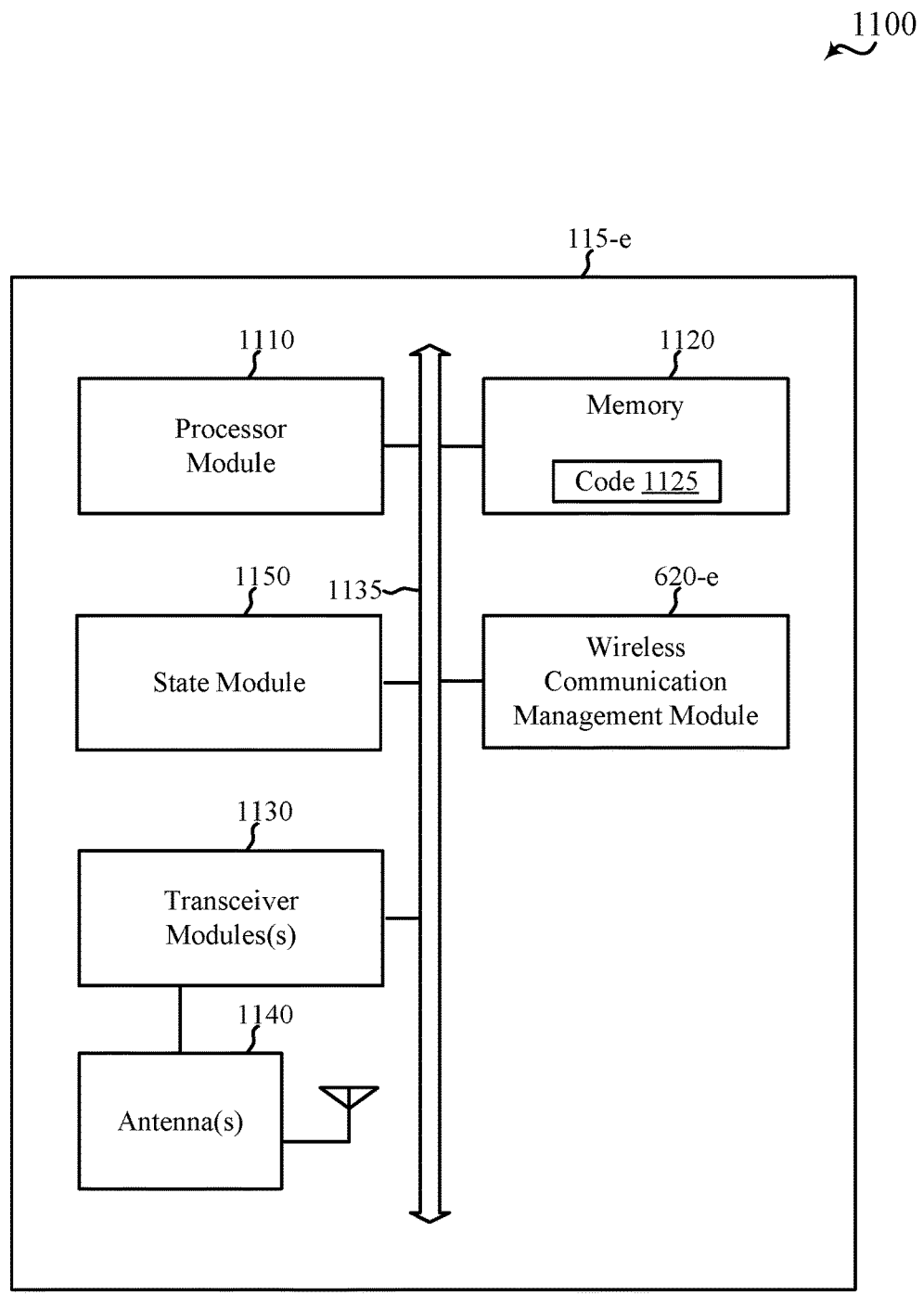
FIG. 11 shows a block diagram of a UE configured for wireless communication, in accordance with various aspects of the present disclosure.

FIG. 11 shows a block diagram 1100 of a UE 115-*e* configured for wireless communication, in accordance with various aspects of the present disclosure. The UE 115-*e* may have various configurations and may be included or be part of a personal computer (e.g., a laptop computer, netbook computer, tablet computer, etc.), a cellular telephone, a PDA, a digital video recorder (DVR), an interne appliance, a gaming console, an e-reader, etc. The UE 115-*e* may in some cases have an internal power supply (not shown), such as a small battery, to facilitate mobile operation. In some embodiments, the UE 115-*e* may be an example of one or more aspects of one of the UEs 115 or the device 605 configured as a UE, as described with reference to FIG. 1, 2, 3, 4, 5, 6, 7, or 8. The UE 115-*e* may be configured to implement at least some of the UE features and functions described with reference to FIG. 1, 2, 3, 4, 5, 6, 7, or 8. The UE 115-*e* may be configured to communicate with one of the first eNBs 105 or the device 605 configured as a first eNB, or with one or more of the second eNBs 135 or the device 605 configured as a second eNB, as described with reference to FIG. 1, 2, 3, 4, 5, 6, 9, or 10.

The UE 115-*e* may include a processor module 1110, memory 1120, at least one transceiver module (represented by transceiver module(s) 1130), at least one antenna (represented by antenna(s) 1140), and a wireless communication management module 620-*e*. Each of these components may be in communication with each other, directly or indirectly, over one or more buses 1135.

The memory 1120 may include random access memory (RAM) or read-only memory (ROM). The memory 1120 may store computer-readable, computer-executable code 1125 containing instructions that are configured to, when executed, cause the processor module 1110 to perform various functions described herein for managing wireless communication. Alternatively, the code 1125 may not be directly executable by the processor module 1110 but be configured to cause the UE 115-*e* (e.g., when compiled and executed) to implement various of the UE features and functions described herein.

The processor module 1110 may include an intelligent hardware device, e.g., a CPU, a microcontroller, an ASIC, etc. The processor module 1110 may process information received through the transceiver module(s) 1130 or information to be sent to the transceiver module(s) 1130 for transmission via the antenna(s) 1140. The processor module 1110 may also handle, alone or in connection with the wireless communication management module 620-*e*, various aspects of managing uplink transmit power for communications with a first eNB and a second eNB.

The transceiver module(s) 1130 may include a modem configured to modulate packets and provide the modulated packets to the antenna(s) 1140 for transmission, and to demodulate packets received from the antenna(s) 1140. The transceiver module(s) 1130 may in some cases be implemented as one or more transmitter modules and one or more separate receiver modules. The transceiver module(s) 1130 may be configured to communicate bi-directionally, via the antenna(s) 1140, with one or more eNBs 105 or 135, or other UEs 115. While the UE 115-*e* may include a single antenna, there may be embodiments in which the UE 115-*e* may include multiple antennas 1140.

The wireless communication management module 620-*e* may be an example of one or more aspects of the wireless communication management module 620 described with reference to FIG. 6, 7, or 8 and may be configured to perform or control some or all of the wireless communication management functions described with reference to FIG. 3, 4, 5, 6, 7, or 8.

According to the architecture of FIG. 11, the UE 115-*e* may further include a state module 1150. The state module 1150 may reflect and control the current device state (e.g., context, authentication, base station association, or other connectivity issues).

By way of example, each of the wireless communication management module 620-*e* or the state module 1150, or a portion of one or both modules, may be a component of the UE 115-*e* in communication with some or all of the other components of the UE 115-*e* via one or more buses 1135. Alternatively, functionality of the wireless communication management module 620-*e* or the state module 1150 may be implemented using a processor, or some or all of the functionality of the wireless communication management module 620-*e* or the state module 1150 may be implemented by the code 1125 or the processor module 1110 or in connection with the processor module 1110.

The components of the UE 115-*e* may, individually or collectively, be implemented using one or more ASICs adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, FPGAs, and other Semi-Custom ICs), which may be programmed in any manner known in the art. The functions of each component may also be implemented, in whole or in part, with instructions embodied in a memory, formatted to be executed by one or more general or application-specific processors. Each of the noted modules may be a means for performing one or more functions related to operation of the UE 115-*e*.

Figure 12:
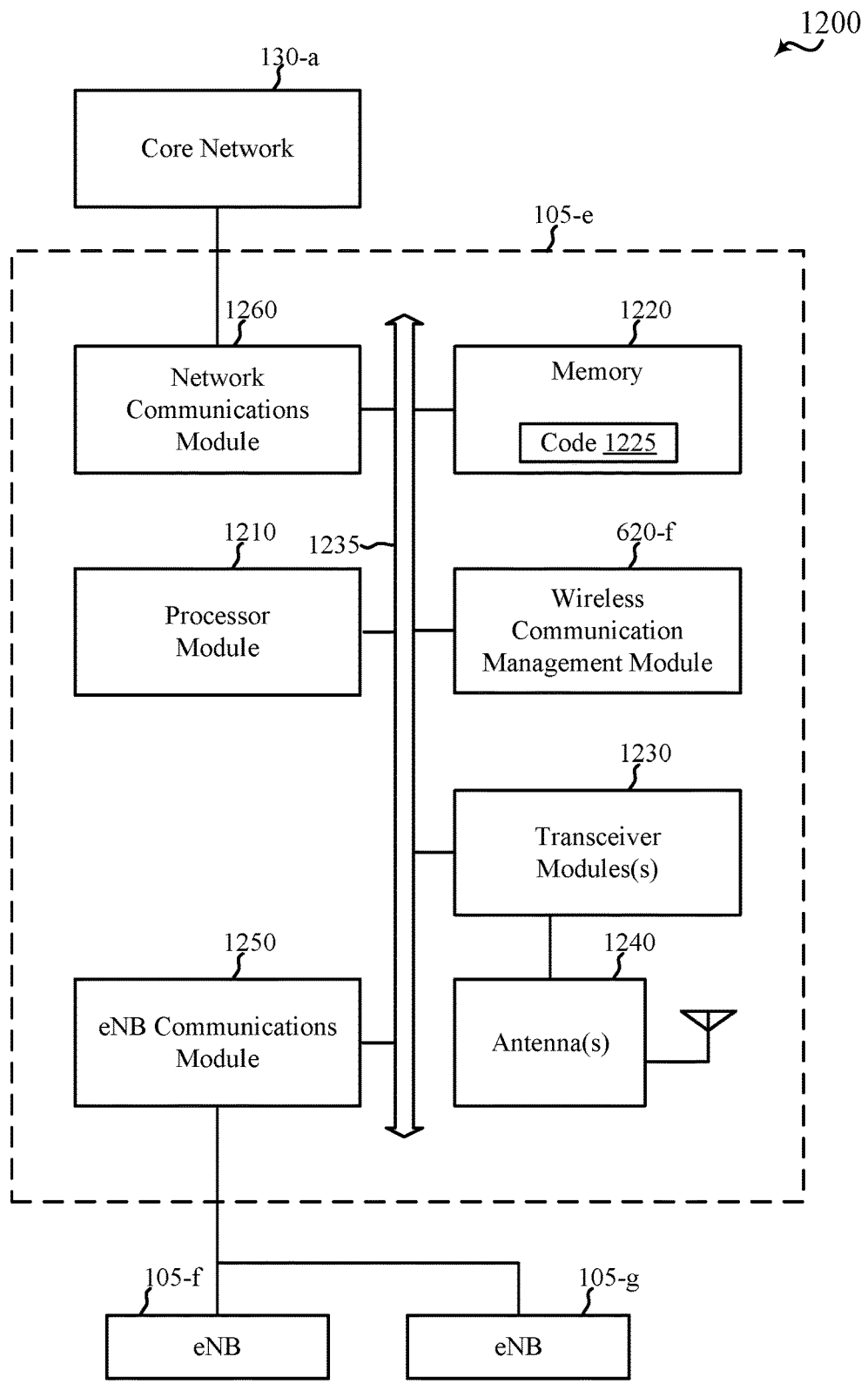
FIG. 12 shows a block diagram illustrating an eNB configured for wireless communication, in accordance with various aspects of the present disclosure.

FIG. 12 shows a block diagram 1200 illustrating an eNB 105-*e* configured for wireless communication, in accordance with various aspects of the present disclosure. In some embodiments, the eNB 105-*e* may be an example of one or more aspects of one of the first eNBs 105 or the device 605 configured as a first eNB, or aspects of one of the second eNBs 135, as described with reference to FIG. 1, 2, 3, 4, 5, 6, 9, or 10. The eNB 105-*e* may be configured to implement at least some of the first eNB or second eNB features and functions described with reference to FIG. 1, 2, 3, 4, 5, 6, 9, or 10. The eNB 105-*e* may be configured to communicate with one or more of the UEs 115 or the device 605 configured as a UE, as described with reference to FIG. 1, 2, 3, 4, 5, 6, 7, or 8. The eNB 105-*e* may also be configured to communicate with a first eNB or a second eNB 135, as described with reference to FIG. 2, 3, 4, 5, 6, 7, 8, 9, 10, or 11.

The eNB 105-*e* may include a processor module 1210, memory 1220, at least one transceiver module (represented by transceiver module(s) 1230), at least one antenna (represented by antenna(s) 1240), and a wireless communication management module 620-*f*. The eNB 105-*e* may also include one or more of an eNB communications module 1250 and a network communications module 1260. Each of these components may be in communication with each other, directly or indirectly, over one or more buses 1235.

The memory 1220 may include RAM or ROM. The memory 1220 may store computer-readable, computer-executable code 1225 containing instructions that are configured to, when executed, cause the processor module 1210 to perform various functions described herein for managing wireless communication. Alternatively, the code 1225 may not be directly executable by the processor module 1210 but be configured to cause the eNB 105-*e* (e.g., when compiled and executed) to perform various of the eNB features and functions described herein.

The processor module 1210 may include an intelligent hardware device, e.g., a CPU, a microcontroller, an ASIC, etc. The processor module 1210 may process information received through the transceiver module(s) 1230, the eNB communications module 1250, or the network communications module 1260. The processor module 1210 may also process information to be sent to the transceiver module(s) 1230 for transmission through the antenna(s) 1240, to the eNB communications module 1250 for transmission to one or more other eNBs 105-*f* and 105-*g*, or to the network communications module 1260 for transmission to a core network 130-*a*, which may be an example of one or more aspects of the core network 130 described with reference to FIG. 1. The processor module 1210 may handle, alone or in connection with the wireless communication management module 620-*f*, various aspects of managing uplink transmit power for one or more UEs communicating with the eNB 105-*e* and at least one other eNB.

The transceiver module(s) 1230 may include a modem configured to modulate packets and provide the modulated packets to the antenna(s) 1240 for transmission, and to demodulate packets received from the antenna(s) 1240. The transceiver module(s) 1230 may in some cases be implemented as one or more transmitter modules and one or more separate receiver modules. The transceiver module(s) 1240 may be configured to communicate bi-directionally, via the antenna(s) 1240, with one or more UEs 115. The eNB 105-*e* may typically include multiple antennas 1240 (e.g., an antenna array). The eNB 105-*e* may communicate with the core network 130-*a* through the network communications module 1260. The eNB 105-*e* may also communicate with other eNBs, such as the eNBs 105-*f* and 105-*g*, using the eNB communications module 1250.

The wireless communication management module 620-*f* may be an example of one or more aspects of the wireless communication management module 620 described with reference to FIG. 6, 9, or 10 and may be configured to perform or control some or all of the wireless communication management functions described with reference to FIG. 3, 4, 5, 6, 9, or 10. By way of example, the wireless communication management module 620-*f*, or a portion thereof, may be a component of the eNB 105-*e* in communication with some or all of the other components of the eNB 105-*e* via one or more buses 1235. Alternatively, functionality of the wireless communication management module 620-*f* may be implemented using a processor, or some or all of the functionality of the wireless communication management module 620-*f* may be implemented by the code 1225 or the processor module 1210 or in connection with the processor module 1210.

The components of the eNB 105-*e* may, individually or collectively, be implemented using one or more ASICs adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, FPGAs, and other Semi-Custom ICs), which may be programmed in any manner known in the art. The functions of each component may also be implemented, in whole or in part, with instructions embodied in a memory, formatted to be executed by one or more general or application-specific processors. Each of the noted modules may be a means for performing one or more functions related to operation of the eNB 105-*e*. The components of the ENB 105-*e* may in some cases be replicated or distributed amongst more than one base station.

Figure 13:
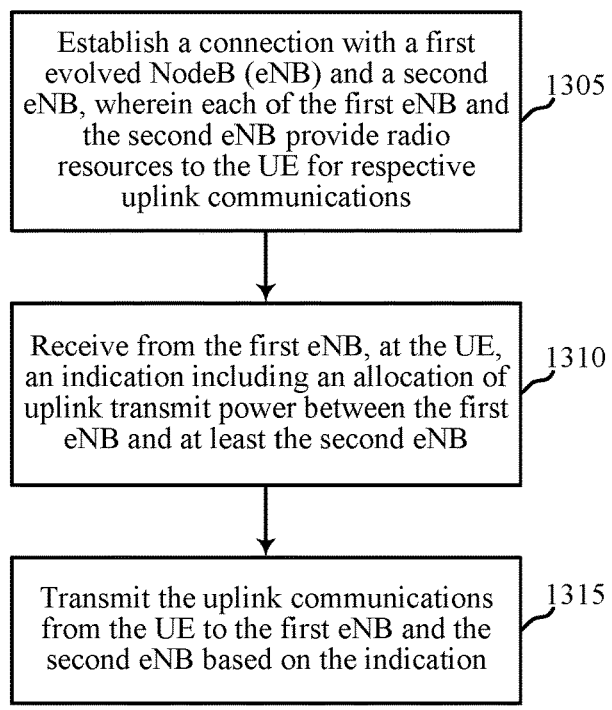
FIG. 13 is a flow chart illustrating a method of wireless communication by a UE, in accordance with various aspects of the present disclosure.

FIG. 13 is a flow chart illustrating a method 1300 of wireless communication by a UE, in accordance with various aspects of the present disclosure. For clarity, the method 1300 is described below with reference to aspects of one of the UEs 115 or the device 605 configured as a UE, as described with reference to FIG. 1, 2, 3, 4, 5, 6, 7, 8, or 1, aspects of one of the first eNBs 105 or the device 605 configured as a first eNB, as described with reference to FIG. 1, 2, 3, 4, 5, 6, 9, 10, or 12, or aspects of one of the second eNBs 135 or the device 605 configured as a second eNB, as described with reference to FIG. 1, 2, 3, 4, 5, 6, or 12. In one implementation, the wireless communication management module 620 described with reference to FIG. 6, 7, 8, or 11 may execute one or more sets of codes to control the functional elements of a UE 115 or the device 605 configured as a UE to perform the functions described below.

At block 1305, a connection with a first eNB and a second eNB may be established, wherein each of the first eNB and the second eNB provide radio resources to the UE for respective uplink communications. Each of the first eNB and the second eNB may also provide radio resources to the UE 115-*b* for respective downlink communications. In some cases, the first eNB may include a master eNB and the second eNB may include a secondary eNB. The operation(s) at block 1305 may be performed or managed using the wireless communication management module 620 described with reference to FIG. 6, 7, 8, or 11, or the eNB connection management module 705 described with reference to FIG. 7 or 8.

At block 1310, an indication of an allocation of uplink transmit power between the first eNB and at least the second eNB may be received from the first eNB. The indication of the allocation of uplink transmit power may in some cases include an indication of a maximum uplink transmit power allocated to each of the first eNB and at least the second eNB. The operation(s) at block 1310 may be performed or managed using the wireless communication management module 620 described with reference to FIG. 6, 7, 8, or 11, or the uplink transmit power management module 710 described with reference to FIG. 7 or 8.

In some embodiments, such as when the first eNB or the second eNB operates in a TDD mode, the indication including an allocation of uplink transmit power between the first eNB and at least the second eNB may be based at least in part on an UL/DL configuration of the first eNB or the second eNB. For example, when an eNB operates in a TDD mode, the number of active uplink carriers can change over time based on the TDD configuration of each cell within the eNB. When the number of active uplink carriers used by an eNB is less during a particular time period, more of the total uplink transmit power available to a UE during the time period may be allocated to another eNB with which the UE may communicate during the time period. Conversely, more of the total uplink transmit power available to the UE during the time period may be allocated to an eNB when the number of active uplink carriers used by the eNB is greater during a particular time period.

In some embodiments, the indication including the allocation of uplink transmit power between the first eNB and at least the second eNB may include an indication of subframes on which substantially all transmit power may be allocated to the first eNB or to the second eNB. For example, during a subframe or time period in which no uplink communications to an eNB are expected, substantially all uplink transmit power may be allocated to one or more other eNBs.

In some cases, the indication may include a time index. The time index may be used to indicate the subframes or time periods in which an eNB is allocated a particular uplink transmit power, and may be used to allocate different uplink transmit powers to different eNBs within a subframe or time period.

In some embodiments, the UE may determine an allocation of uplink transmit power between a plurality of cells of the first eNB or the second eNB based on the indication including the allocation of uplink transmit power between the first eNB and at least the second eNB. The allocation of uplink transmit power between the plurality of cells may in some cases be semi-statically specified in the indication (e.g., the first eNB may specify or configure an uplink transmit power value for each cell, which uplink transmit power value may be used by the UE until the UE receives, from the first eNB, an adjusted indication including an allocation of uplink transmit power between the first eNB and at least the second eNB). The allocation of uplink transmit power between the plurality of cells may in other cases be semi-statically specified per time index in the indication (e.g., the first eNB may specify or configure multiple uplink transmit power values for each cell, for each time index, which uplink transmit power values may be used by the UE until the UE receives, from the first eNB, an adjusted indication including an allocation of uplink transmit power between the first eNB and at least the second eNB).

In some embodiments, the indication including an allocation of uplink transmit power between the first eNB and at least the second eNB may include an allocation of total transmit power between communications with the first eNB and the second eNB. In these embodiments, the UE may determine, at the UE, an uplink transmit power for each of a plurality of cells controlled by the first eNB or the second eNB based on the indication including the allocation of uplink transmit power between the first eNB and at least the second eNB. In some cases, the uplink transmit power per cell (e.g., the maximum uplink transmit power per cell) may be dynamically adjusted at the UE.

At block 1315, the uplink communications may be transmitted from the UE to the first eNB and the second eNB based on the indication including an allocation of uplink transmit power between the first eNB and at least the second eNB. The operation(s) at block 1315 may be performed or managed using the wireless communication management module 620 described with reference to FIG. 6, 7, 8, or 11, or the uplink communications management module 715 described with reference to FIG. 7 or 8.

Therefore, the method 1300 may be used for wireless communication. It should be noted that the method 1300 is just one implementation and that the operations of the method 1300 may be rearranged or otherwise modified such that other implementations are possible.

Figure 14:
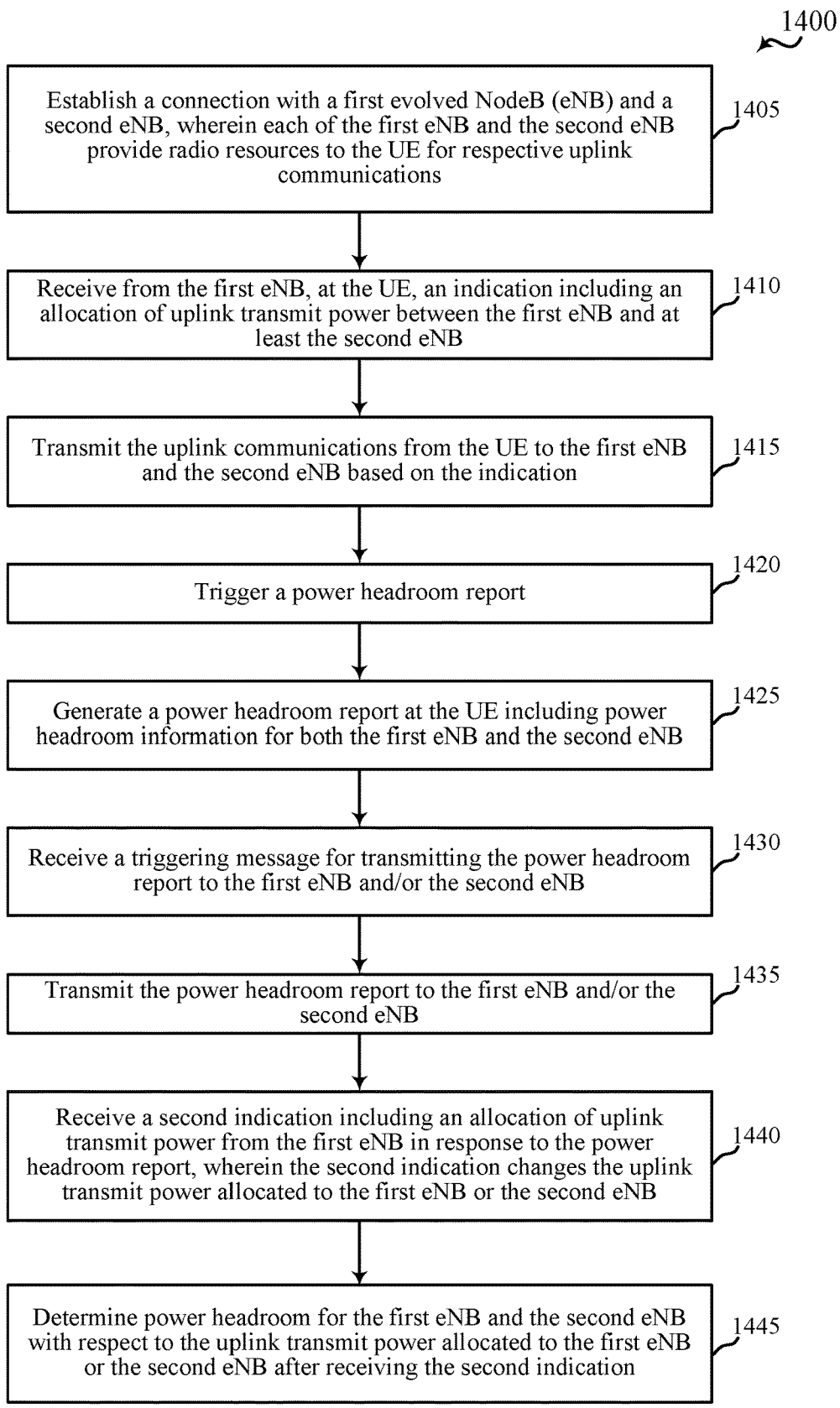
FIG. 14 is a flow chart illustrating a method of wireless communication by a UE, in accordance with various aspects of the present disclosure.

FIG. 14 is a flow chart illustrating a method 1400 of wireless communication by a UE, in accordance with various aspects of the present disclosure. For clarity, the method 1400 is described below with reference to aspects of one of the UEs 115 or the device 605 configured as a UE, as described with reference to FIG. 1, 2, 3, 4, 5, 6, 7, 8, or 1, aspects of one of the first eNBs 105 or the device 605 configured as a first eNB, as described with reference to FIG. 1, 2, 3, 4, 5, 6, 9, 10, or 12, or aspects of one of the second eNBs 135 or the device 605 configured as a second eNB, as described with reference to FIG. 1, 2, 3, 4, 5, 6, or 12. In one implementation, the wireless communication management module 620 described with reference to FIG. 6, 7, 8, or 11 may execute one or more sets of codes to control the functional elements of a UE 115 or the device 605 configured as a UE to perform the functions described below.

At block 1405, a connection with a first eNB and a second eNB may be established, wherein each of the first eNB and the second eNB provide radio resources to the UE for respective uplink communications. Each of the first eNB and the second eNB may also provide radio resources to the UE 115-b for respective downlink communications. In some cases, the first eNB may include a master eNB and the second eNB may include a secondary eNB. The operation(s) at block 1405 may be performed or managed using the wireless communication management module 620 described with reference to FIG. 6, 7, 8, or 11, or the eNB connection management module 705 described with reference to FIG. 7 or 8.

At block 1410, an indication of an allocation of uplink transmit power between the first eNB and at least the second eNB may be received from the first eNB. The indication of the allocation of uplink transmit power may in some cases include an indication of a maximum uplink transmit power, or a percentage of uplink transmit power, allocated to each of the first eNB and at least the second eNB. The operation(s) at block 1410 may be performed or managed using the wireless communication management module 620 described with reference to FIG. 6, 7, 8, or 11, or the uplink transmit power management module 710 described with reference to FIG. 7 or 8.

In some embodiments, such as when the first eNB or the second eNB operates in a TDD mode, the indication including an allocation of uplink transmit power between the first eNB and at least the second eNB may be based at least in part on an UL/DL configuration of the first eNB or the second eNB. For example, when an eNB operates in a TDD mode, the number of active uplink carriers can change over time based on the TDD configuration of each cell within the eNB. When the number of active uplink carriers used by an eNB is less during a particular time period, more of the total uplink transmit power available to a UE during the time period may be allocated to another eNB with which the UE may communicate during the time period. Conversely, more of the total uplink transmit power available to the UE during the time period may be allocated to an eNB when the number of active uplink carriers used by the eNB is greater during a particular time period.

In some embodiments, the indication including the allocation of uplink transmit power between the first eNB and at least the second eNB may include an indication of subframes on which substantially all transmit power may be allocated to the first eNB or to the second eNB. For example, during a subframe or time period in which no uplink communications to an eNB are expected, substantially all uplink transmit power may be allocated to one or more other eNBs.

In some cases, the indication may include a time index. The time index may be used to indicate the subframes or time periods in which an eNB is allocated a particular uplink transmit power, and may be used to allocate different uplink transmit powers to different eNBs within a subframe or time period.

In some embodiments, the UE may determine an allocation of uplink transmit power between a plurality of cells of the first eNB or the second eNB based on the indication including the allocation of uplink transmit power between the first eNB and at least the second eNB. The allocation of uplink transmit power between the plurality of cells may in some cases be semi-statically specified in the indication (e.g., the first eNB may specify or configure an uplink transmit power value for each cell, which uplink transmit power value may be used by the UE until the UE receives, from the first eNB, an adjusted indication including an allocation of uplink transmit power between the first eNB and at least the second eNB). The allocation of uplink transmit power between the plurality of cells may in other cases be semi-statically specified per time index in the indication (e.g., the first eNB may specify or configure multiple uplink transmit power values for each cell, for each time index, which uplink transmit power values may be used by the UE until the UE receives, from the first eNB, an adjusted indication including an allocation of uplink transmit power between the first eNB and at least the second eNB).

In some embodiments, the indication including an allocation of uplink transmit power between the first eNB and at least the second eNB may include an allocation of total transmit power between communications with the first eNB and the second eNB. In these embodiments, the UE may determine, at the UE, an uplink transmit power for each of a plurality of cells controlled by the first eNB or the second eNB based on the indication including the allocation of uplink transmit power between the first eNB and at least the second eNB. In some cases, the uplink transmit power per cell (e.g., the maximum uplink transmit power per cell) may be dynamically adjusted at the UE.

At block 1415, the uplink communications may be transmitted from the UE to the first eNB and the second eNB based on the indication including an allocation of uplink transmit power between the first eNB and at least the second eNB. The operation(s) at block 1415 may be performed or managed using the wireless communication management module 620 described with reference to FIG. 6, 7, 8, or 11, or the uplink communications management module 715 described with reference to FIG. 7 or 8.

At block 1420, a power headroom report at the UE may be triggered. In some embodiments, a power headroom report for an eNB (e.g., the first eNB or the second eNB) may be triggered based on a condition of the eNB or a neighbor eNB (e.g., an eNB other than the eNB for which the power headroom report is triggered). By way of example, the condition of the eNB or the neighbor eNB may be a determination that an uplink transmit power of the UE for the eNB or the neighbor eNB has crossed a threshold. In some cases, the threshold may include a maximum uplink power for the eNB. By way of further example, the condition of the eNB or the neighbor eNB may be a measured pathloss (e.g., a pathloss variation satisfying a threshold) of the eNB or the neighbor eNB. By way of still further example, the condition of the eNB or the neighbor eNB may be a determination that the eNB or the neighbor eNB has activated an uplink cell.

At block 1425, a power headroom report may be generated at the UE. The power headroom report may include power headroom information for both the first eNB and the second eNB. The inclusion of power headroom information for both the first eNB and the second eNB may reduce power headroom report overhead and enable an eNB to estimate the total uplink transmit power used by the UE. In some examples, the power headroom information may be computed using Equation 1.

The operation(s) at block 1420 or 1425 may be performed or managed using the wireless communication management module 620 described with reference to FIG. 6, 7, 8, or 11, or the power headroom report generation module 805 described with reference to FIG. 8.

In some embodiments, a power headroom report may be automatically transmitted to an eNB for which the power headroom report is triggered. In other embodiments, a power headroom report may be transmitted to an eNB for which the power headroom report is triggered in response to a triggering message received from the eNB at block 1430. In the latter embodiments, and by way of example, a power headroom report triggered for the first eNB may be transmitted to the first eNB in response to a triggering message received from the first eNB.

At block 1435, a power headroom report may be transmitted to the first eNB or the second eNB. In some cases, a power headroom report may be transmitted to the eNB for which the power headroom report was triggered (e.g., a power headroom report triggered for the first eNB may be transmitted to the first eNB). In other cases, a power headroom report may be transmitted to the eNB for which the power headroom report was triggered, as well as a neighbor eNB (e.g., a power headroom report triggered for the first eNB may be transmitted to the first eNB and the second eNB). In the latter cases, the UE may in some cases transmit a power headroom report to a neighbor eNB based on a determination that uplink resources are allocated to the UE for an uplink transmission to the neighbor eNB. The operation(s) at block 1435 may be performed or managed using the wireless communication management module 620 described with reference to FIG. 6, 7, 8, or 11, or the power headroom report transmission module 810 described with reference to FIG. 8.

At block 1440, a second indication including an allocation of uplink transmit power may be received from the first eNB. The second indication may be received in response to the power headroom report transmitted at block 1435. The second indication including an allocation of uplink transmit power may change the uplink transmit power allocated to the first eNB or the second eNB. The operation(s) at block 1440 may be performed or managed using the wireless communication management module 620 described with reference to FIG. 6, 7, 8, or 11, or the uplink transmit power management module 710 described with reference to FIG. 7 or 8.

At block 1445, and after receiving the second indication including an allocation of uplink transmit power, the UE may determine power headroom for the first eNB and the second eNB with respect to the uplink transmit power allocated to the first eNB or the second eNB in the second indication including an allocation of uplink transmit power. The operation(s) at block 1445 may be performed or managed using the wireless communication management module 620 described with reference to FIG. 6, 7, 8, or 11, or the power headroom report generation module 805 described with reference to FIG. 8.

Therefore, the method 1400 may be used for wireless communication. It should be noted that the method 1400 is just one implementation and that the operations of the method 1400 may be rearranged or otherwise modified such that other implementations are possible.

Figure 15:
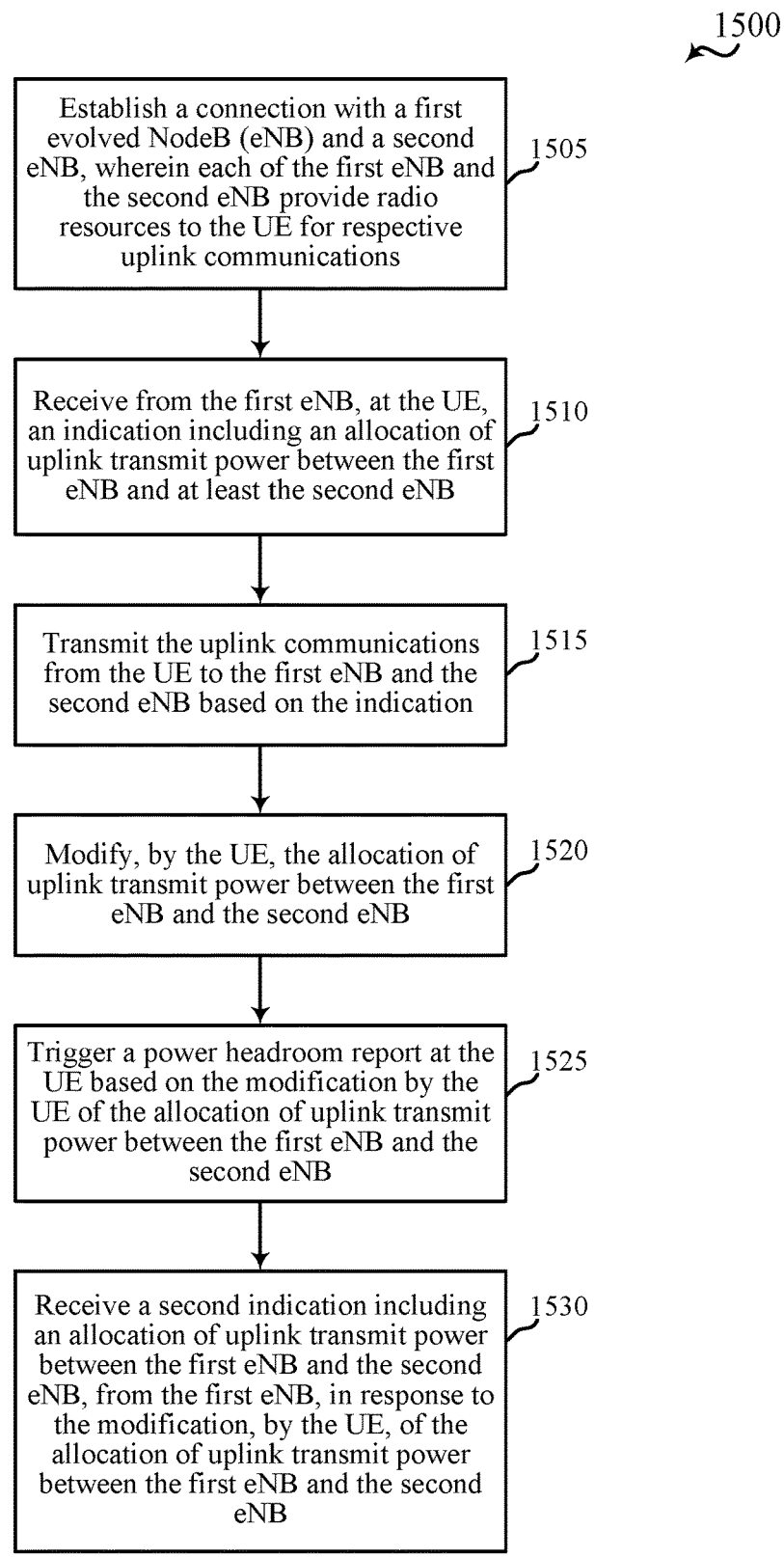
FIG. 15 is a flow chart illustrating a method of wireless communication by a UE, in accordance with various aspects of the present disclosure.

FIG. 15 is a flow chart illustrating a method 1500 of wireless communication by a UE, in accordance with various aspects of the present disclosure. For clarity, the method 1500 is described below with reference to aspects of one of the UEs 115 or the device 605 configured as a UE, as described with reference to FIG. 1, 2, 3, 4, 5, 6, 7, 8, or 1, aspects of one of the first eNBs 105 or the device 605 configured as a first eNB, as described with reference to FIG. 1, 2, 3, 4, 5, 6, 9, 10, or 12, or aspects of one of the second eNBs 135 or the device 605 configured as a second eNB, as described with reference to FIG. 1, 2, 3, 4, 5, 6, or 12. In one implementation, the wireless communication management module 620 described with reference to FIG. 6, 7, 8, or 11 may execute one or more sets of codes to control the functional elements of a UE 115 or the device 605 configured as a UE to perform the functions described below.

At block 1505, a connection with a first eNB and a second eNB may be established, wherein each of the first eNB and the second eNB provide radio resources to the UE for respective uplink communications. Each of the first eNB and the second eNB may also provide radio resources to the UE 115-b for respective downlink communications. In some cases, the first eNB may include a master eNB and the second eNB may include a secondary eNB. The operation(s) at block 1505 may be performed or managed using the wireless communication management module 620 described with reference to FIG. 6, 7, 8, or 11, or the eNB connection management module 705 described with reference to FIG. 7 or 8.

At block 1510, an indication including an allocation of uplink transmit power between the first eNB and at least the second eNB may be received from the first eNB. The indication of the allocation of uplink transmit power may in some cases include an indication of a maximum uplink transmit power allocated to each of the first eNB and at least the second eNB. The operation(s) at block 1510 may be performed or managed using the wireless communication management module 620 described with reference to FIG. 6, 7, 8, or 11, or the uplink transmit power management module 710 described with reference to FIG. 7 or 8.

In some embodiments, such as when the first eNB or the second eNB operates in a TDD mode, the indication including an allocation of uplink transmit power between the first eNB and at least the second eNB may be based at least in part on an UL/DL configuration of the first eNB or the second eNB. For example, when an eNB operates in a TDD mode, the number of active uplink carriers can change over time based on the TDD configuration of each cell within the eNB. When the number of active uplink carriers used by an eNB is less during a particular time period, more of the total uplink transmit power available to a UE during the time period may be allocated to another eNB with which the UE may communicate during the time period. Conversely, more of the total uplink transmit power available to the UE during the time period may be allocated to an eNB when the number of active uplink carriers used by the eNB is greater during a particular time period.

In some embodiments, the indication including the allocation of uplink transmit power between the first eNB and at least the second eNB may include an indication of subframes on which substantially all transmit power may be allocated to the first eNB or to the second eNB. For example, during a subframe or time period in which no uplink communications to an eNB are expected, substantially all uplink transmit power may be allocated to one or more other eNBs.

In some cases, the indication may include a time index. The time index may be used to indicate the subframes or time periods in which an eNB is allocated a particular uplink transmit power, and may be used to allocate different uplink transmit powers to different eNBs within a subframe or time period.

In some embodiments, the UE may determine an allocation of uplink transmit power between a plurality of cells of the first eNB or the second eNB based on the indication including the allocation of uplink transmit power between the first eNB and at least the second eNB. The allocation of uplink transmit power between the plurality of cells may in some cases be semi-statically specified in the indication (e.g., the first eNB may specify or configure an uplink transmit power value for each cell, which uplink transmit power value may be used by the UE until the UE receives, from the first eNB, an adjusted indication including an allocation of uplink transmit power between the first eNB and at least the second eNB). The allocation of uplink transmit power between the plurality of cells may in other cases be semi-statically specified per time index in the indication (e.g., the first eNB may specify or configure multiple uplink transmit power values for each cell, for each time index, which uplink transmit power values may be used by the UE until the UE receives, from the first eNB, an adjusted indication including an allocation of uplink transmit power between the first eNB and at least the second eNB).

In some embodiments, the indication including an allocation of uplink transmit power between the first eNB and at least the second eNB may include an allocation of total transmit power between communications with the first eNB and the second eNB. In these embodiments, the UE may determine, at the UE, an uplink transmit power for each of a plurality of cells controlled by the first eNB or the second eNB based on the indication including the allocation of uplink transmit power between the first eNB and at least the second eNB. In some cases, the uplink transmit power per cell (e.g., the maximum uplink transmit power per cell) may be dynamically adjusted at the UE.

At block 1515, the uplink communications may be transmitted from the UE to the first eNB and the second eNB based on the indication including an allocation of uplink transmit power between the first eNB and at least the second eNB. The operation(s) at block 1515 may be performed or managed using the wireless communication management module 620 described with reference to FIG. 6, 7, 8, or 11, or the uplink communications management module 715 described with reference to FIG. 7 or 8.

At block 1520, an allocation of total uplink transmit power between the first eNB and the second eNB (or an allocation of uplink transmit power between cells) may be modified by the UE. In some cases, the UE may modify an allocation of total uplink transmit power by borrowing uplink transmit power allocated to one eNB or cell and re-allocating the borrowed uplink transmit power to another eNB or cell. The modification of the allocation of total uplink transmit power may in some cases be based on a priority of uplink data or control information for one of the eNBs (e.g., the first eNB or the second eNB) with respect to the other of the eNBs. The modification may also or alternately be based on a priority of uplink data or control information for a cell. The modification may also or alternately be based on non-use of an uplink by an eNB or cell.

At block 1525, a power headroom report at the UE may be triggered based on the modification by the UE of the allocation of uplink transmit power between the first eNB and the second eNB (or between cells of one or more of the first eNB and the second eNB). In some cases, the power headroom report may include an indication that an uplink transmit power for one of the first eNB or the second eNB has exceeded a maximum transmit power allocated to that eNB.

At block 1530, a power headroom report may be generated at the UE. The power headroom report may include power headroom information for both the first eNB and the second eNB. The inclusion of power headroom information for both the first eNB and the second eNB may reduce power headroom report overhead and enable an eNB to estimate the total uplink transmit power used by the UE. In some examples, the power headroom information may be computed using Equation 1.

At block 1535, a power headroom report may be transmitted to the first eNB or the second eNB. In some cases, a power headroom report may be transmitted to an eNB that received power during modification of an allocation of uplink transmit power. Such a power headroom report may include negative power headroom information. In other cases, a power headroom report may be transmitted to an eNB from which power was borrowed during modification of an allocation of uplink transmit power. The latter power headroom report may subtract the borrowed power from the configured maximum power for an eNB or cell. In the case of power headroom information per cell, the power headroom information may be computed using Equation 2.

At block 1540, a second indication including an allocation of uplink transmit power may be received from the first eNB, in response to the modification by the UE of the allocation of uplink transmit power.

Therefore, the method 1500 may be used for wireless communication. It should be noted that the method 1500 is just one implementation and that the operations of the method 1500 may be rearranged or otherwise modified such that other implementations are possible.

Figure 16:
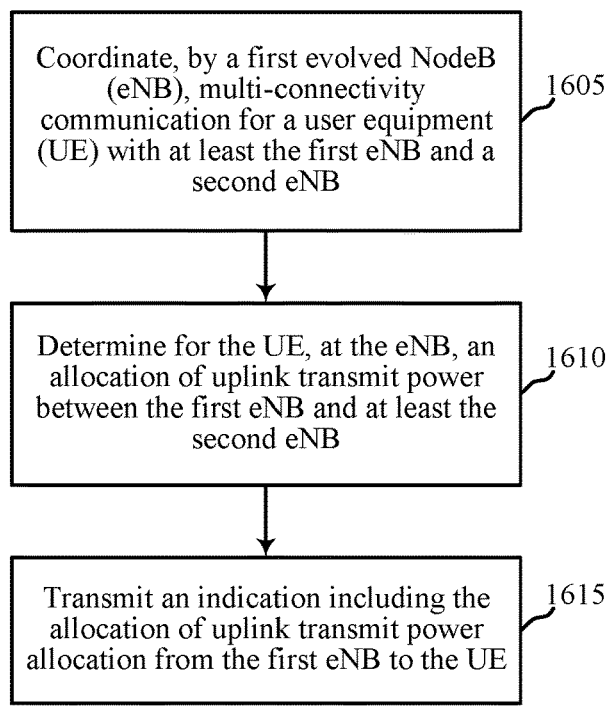
FIG. 16 is a flow chart illustrating a method of wireless communication, in accordance with various aspects of the present disclosure.

FIG. 16 is a flow chart illustrating a method 1600 of wireless communication, in accordance with various aspects of the present disclosure. For clarity, the method 1600 is described below with reference to aspects of one of the first eNBs 105 or the device 605 configured as a first eNB, as described with reference to FIG. 1, 2, 3, 4, 5, 6, 9, 10, or 12, aspects of one of the UEs 115 or the device 605 configured as a UE, as described with reference to FIG. 1, 2, 3, 4, 5, 6, 7, 8, or 1, or aspects of one of the second eNBs 135 or the device 605 configured as a second eNB, as described with reference to FIG. 1, 2, 3, 4, 5, 6, or 12. In one implementation, the wireless communication management module 620 described with reference to FIG. 6, 9, 10, or 12 may execute one or more sets of codes to control the functional elements of a first eNB 105 or the device 605 configured as a first eNB to perform the functions described below.

At block 1605, a first eNB may coordinate, for a UE, multi-connectivity communication with at least the first eNB and a second eNB. In some cases, the first eNB may include a master eNB and the second eNB may include a secondary eNB. The operation(s) at block 1605 may be performed or managed using the wireless communication management module 620 described with reference to FIG. 6, 9, 10, or 12, or the UE multi-connectivity management module 905 described with reference to FIG. 9 or 10.

At block 1610, an allocation of uplink transmit power between the first eNB and at least the second eNB may be determined for the UE. The allocation of uplink transmit power may in some cases include an allocation of maximum uplink transmit power, or a percentage of uplink transmit power, to each of the first eNB and at least the second eNB. The operation(s) at block 1610 may be performed or managed using the wireless communication management module 620 described with reference to FIG. 6, 9, 10, or 12, or the uplink transmit power determination module 910 described with reference to FIG. 9 or 10.

In some embodiments, the first eNB may determine an allocation of uplink transmit power between a plurality of cells of the first eNB based on the indication including the allocation of uplink transmit power between the device first eNB and at least the second eNB. The allocation of uplink transmit power between the plurality of cells may in some cases be semi-statically specified in the indication (e.g., the first eNB may specify or configure an uplink transmit power value for each cell, which uplink transmit power value may be used by the UE until the UE receives, from the first eNB, an adjusted indication including an allocation of uplink transmit power between the first eNB and at least the second eNB). The allocation of uplink transmit power between the plurality of cells may in other cases be semi-statically specified per time index in the indication (e.g., the first eNB may specify or configure multiple uplink transmit power values for each cell, for each time index, which uplink transmit power values may be used by the UE until the UE receives, from the first eNB, an adjusted indication including an allocation of uplink transmit power between the first eNB and at least the second eNB).

At block 1615, an indication including the allocation of uplink transmit power allocation may be transmitted from the first eNB to the UE. The operation(s) at block 1615 may be performed or managed using the wireless communication management module 620 described with reference to FIG. 6, 9, 10, or 12, or the uplink transmit power communication module 915 described with reference to FIG. 9 or 10.

In some embodiments, such as when the first eNB or the second eNB operates in a TDD mode, the indication including the allocation of uplink transmit power between the first eNB and at least the second eNB may be based at least in part on an UL/DL configuration of the first eNB or the second eNB. For example, when an eNB operates in a TDD mode, the number of active uplink carriers can change over time based on the TDD configuration of each cell within the eNB. When the number of active uplink carriers used by an eNB is less during a particular time period, more of the total uplink transmit power available to a UE during the time period may be allocated to another eNB with which the UE may communicate during the time period. Conversely, more of the total uplink transmit power available to the UE during the time period may be allocated to an eNB when the number of active uplink carriers used by the eNB is greater during a particular time period.

In some embodiments, the indication including the allocation of uplink transmit power between the first eNB and at least the second eNB may include an indication of subframes on which substantially all transmit power may be allocated to the first eNB or to the second eNB. For example, during a subframe or time period in which no uplink communications to an eNB are expected, substantially all uplink transmit power may be allocated to one or more other eNBs.

In some cases, the indication may include a time index. The time index may be used to indicate the subframes or time periods in which an eNB is allocated a particular uplink transmit power, and may be used to allocate different uplink transmit powers to different eNBs within a subframe or time period.

Therefore, the method 1600 may be used for wireless communication. It should be noted that the method 1600 is just one implementation and that the operations of the method 1600 may be rearranged or otherwise modified such that other implementations are possible.

Figure 17:
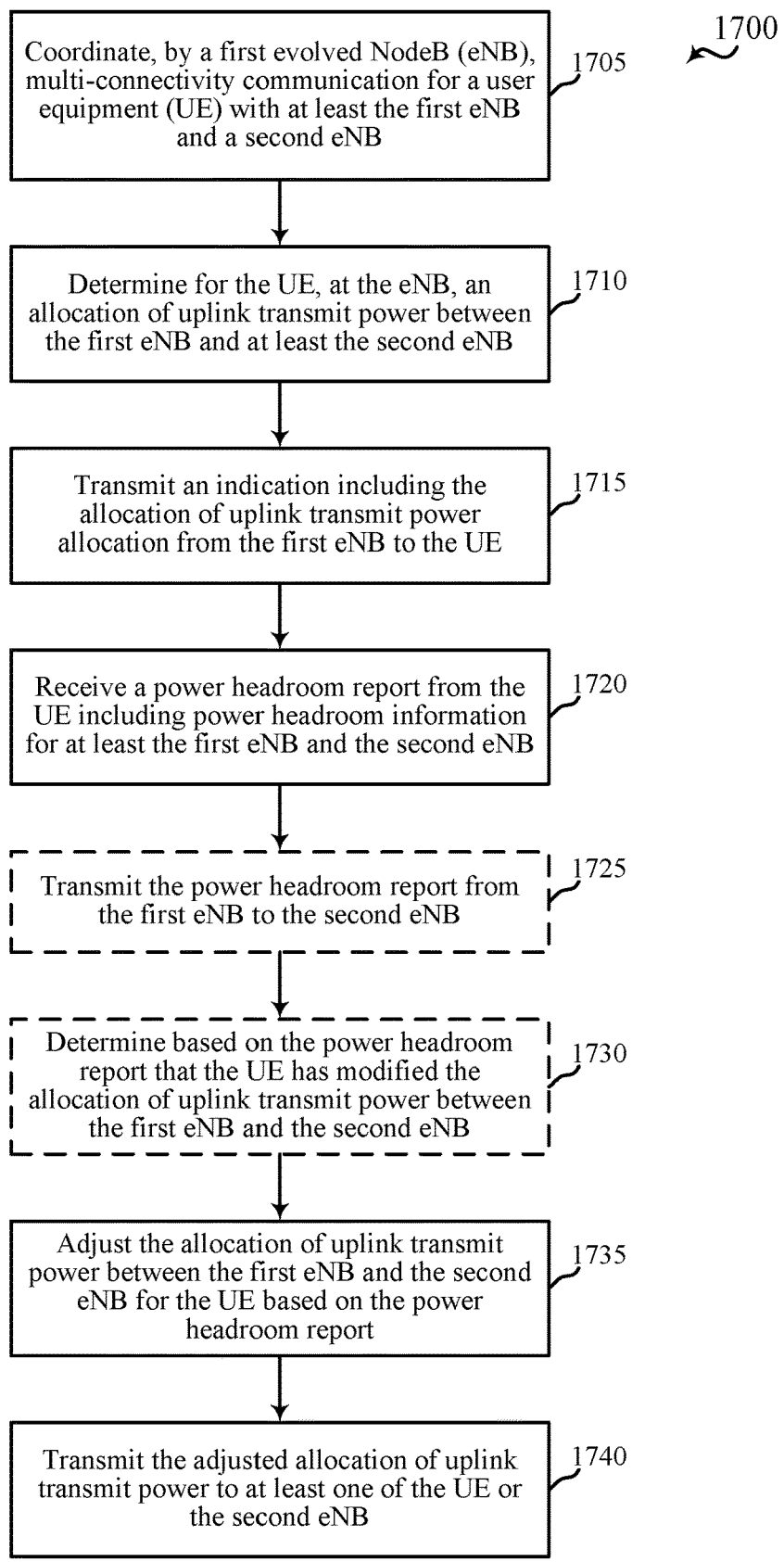
FIG. 17 is a flow chart illustrating a method of wireless communication by a UE, in accordance with various aspects of the present disclosure.

FIG. 17 is a flow chart illustrating a method 1700 of wireless communication, in accordance with various aspects of the present disclosure. For clarity, the method 1700 is described below with reference to aspects of one of the first eNBs 105 or the device 605 configured as a first eNB, as described with reference to FIG. 1, 2, 3, 4, 5, 6, 9, 10, or 12, aspects of one of the UEs 115 or the device 605 configured as a UE, as described with reference to FIG. 1, 2, 3, 4, 5, 6, 7, 8, or 1, or aspects of one of the second eNBs 135 or the device 605 configured as a second eNB, as described with reference to FIG. 1, 2, 3, 4, 5, 6, or 12. In one implementation, the wireless communication management module 620 described with reference to FIG. 6, 9, 10, or 12 may execute one or more sets of codes to control the functional elements of a first eNB 105 or the device 605 configured as a first eNB to perform the functions described below.

At block 1705, a first eNB may coordinate, for a UE, multi-connectivity communication with at least the first eNB and a second eNB. In some cases, the first eNB may include a master eNB and the second eNB may include a secondary eNB. The operation(s) at block 1705 may be performed or managed using the wireless communication management module 620 described with reference to FIG. 6, 9, 10, or 12, or the UE multi-connectivity management module 905 described with reference to FIG. 9 or 10.

At block 1710, an allocation of uplink transmit power between the first eNB and at least the second eNB may be determined for the UE. The allocation of uplink transmit power may in some cases include an allocation of maximum uplink transmit power, or a percentage of uplink transmit power, to each of the first eNB and at least the second eNB. The operation(s) at block 1710 may be performed or managed using the wireless communication management module 620 described with reference to FIG. 6, 9, 10, or 12, or the uplink transmit power determination module 910 described with reference to FIG. 9 or 10.

In some embodiments, the first eNB may determine an allocation of uplink transmit power between a plurality of cells of the first eNB based on the indication including the allocation of uplink transmit power between the device first eNB and at least the second eNB. The allocation of uplink transmit power between the plurality of cells may in some cases be semi-statically specified in the indication (e.g., the first eNB may specify or configure an uplink transmit power value for each cell, which uplink transmit power value may be used by the UE until the UE receives, from the first eNB, an adjusted indication including an allocation of uplink transmit power between the first eNB and at least the second eNB). The allocation of uplink transmit power between the plurality of cells may in other cases be semi-statically specified per time index in the indication (e.g., the first eNB may specify or configure multiple uplink transmit power values for each cell, for each time index, which uplink transmit power values may be used by the UE until the UE receives, from the first eNB, an adjusted indication including an allocation of uplink transmit power between the first eNB and at least the second eNB).

At block 1715, an indication including the allocation of uplink transmit power allocation may be transmitted from the first eNB to the UE. The operation(s) at block 1715 may be performed or managed using the wireless communication management module 620 described with reference to FIG. 6, 9, 10, or 12, or the uplink transmit power communication module 915 described with reference to FIG. 9 or 10.

In some embodiments, such as when the first eNB or the second eNB operates in a TDD mode, the indication including the allocation of uplink transmit power between the first eNB and at least the second eNB may be based at least in part on an UL/DL configuration of the first eNB or the second eNB. For example, when an eNB operates in a TDD mode, the number of active uplink carriers can change over time based on the TDD configuration of each cell within the eNB. When the number of active uplink carriers used by an eNB is less during a particular time period, more of the total uplink transmit power available to a UE during the time period may be allocated to another eNB with which the UE may communicate during the time period. Conversely, more of the total uplink transmit power available to the UE during the time period may be allocated to an eNB when the number of active uplink carriers used by the eNB is greater during a particular time period.

In some embodiments, the indication including the allocation of uplink transmit power between the first eNB and at least the second eNB may include an indication of subframes on which substantially all transmit power may be allocated to the first eNB or to the second eNB. For example, during a subframe or time period in which no uplink communications to an eNB are expected, substantially all uplink transmit power may be allocated to one or more other eNBs.

In some cases, the indication may include a time index. The time index may be used to indicate the subframes or time periods in which an eNB is allocated a particular uplink transmit power, and may be used to allocate different uplink transmit powers to different eNBs within a subframe or time period.

At block 1720, a power headroom report including power headroom information for at least the first eNB and the second eNB may be received from the UE. In some cases, the power headroom report may be received in response to at least one of: an uplink transmit power of the UE for the second eNB, a measured pathloss variation for the second eNB, or the second eNB activating an uplink cell, as described with reference to block 1420 of FIG. 14. In some cases, the power headroom report may be received in response to the first eNB sending a triggering message (e.g., a request for a power headroom report) to the UE.

At block 1725, the power headroom report may be optionally transmitted from the first eNB to the second eNB.

In some embodiments, the power headroom report may indicate that the UE has modified the allocation of uplink transmit power between the first eNB and the second eNB, and at block 1730, the first eNB may determine, based on the power headroom report, that the UE has modified the allocation of uplink transmit power between the first eNB and the second eNB. In other embodiments, the power headroom report may not indicate that the UE has modified the allocation of uplink transmit power between the first eNB and the second eNB.

At block 1735, the allocation of uplink transmit power between the first eNB and the second eNB for the UE may be adjusted based on the power headroom report. In some cases, the adjustment may be based on a modification by the UE to the allocation of uplink transmit power between the first eNB and the second eNB, as determined at block 1730.

At block 1740, the adjusted allocation of uplink transmit power may be transmitted to at least one of the UE or the second eNB.

In some embodiments of the method 1700, the adjustment of the allocation of uplink transmit power between the first eNB and the second eNB for the UE, at block 1735, may also or alternately be made based on a message received at the first eNB from the second eNB. The message may include the power headroom report of the UE or information generated by the second eNB.

In some embodiments of the method 1700, the first eNB may schedule communications (e.g., downlink or uplink communications) with the UE. The communications between the UE and the first eNB may be scheduled independently from communications between the UE and the second eNB.

Therefore, the method 1700 may be used for wireless communication. It should be noted that the method 1700 is just one implementation and that the operations of the method 1700 may be rearranged or otherwise modified such that other implementations are possible.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may, individually or collectively, be implemented or performed with one or more application-specific integrated circuits (ASICs) adapted to perform some or all of the applicable functions in hardware. Alternatively, the functions may be performed by one or more other processing units (or cores) such as a general-purpose processor or a digital signal processor (DSP), or on one or more integrated circuits. A general-purpose processor may be a microprocessor, any conventional processor, controller, microcontroller, state machine, or combination thereof. A processor may also be implemented as a combination of computing devices, e.g., a combination of a DSP and a microprocessor, multiple microprocessors, one or more microprocessors in conjunction with a DSP core, or any other such configuration. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each of the blocks and modules may also be implemented, in whole or in part, with instructions embodied in a memory, formatted to be executed by one or more general or application-specific processors.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" such as when used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The detailed description set forth above in connection with the appended drawings is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments. Thus, the disclosure is not to be limited to the examples and designs described herein but is to be accorded the widest scope consistent with the principles and novel features disclosed herein.

What is claimed is:

1. A method of wireless communication, comprising:
   coordinating, by a first base station, multi-connectivity communication for a user equipment (UE) with at least the first base station and a second base station;
   determining, by the first base station, a configuration of uplink transmit power for the UE in the multi-connectivity communication, the configuration including a first uplink transmit power value for the first base station and a second uplink transmit power value for the second base station; and
   transmitting, by the first base station to the UE, an indication of the configuration of uplink transmit power, wherein the configuration of uplink transmit power is dynamically adjustable by the UE between the first base station and the second base station such that an allocation of uplink transmit power for one of uplink communications to the first base station or uplink communications to the second base station is greater than the corresponding first or second uplink transmit power value, subject to a maximum transmit power for the UE.

2. The method of claim 1, further comprising:
   receiving, by the first base station, a message from the second base station; and
   adjusting at least one of the first uplink transmit power value for the first base station or the second uplink transmit power value for the second base station, the adjusting based at least in part on the message received from the second base station.

3. The method of claim 1, further comprising:
   transmitting the configuration of uplink transmit power from the first base station to the second base station.

4. The method of claim 3, wherein transmitting the configuration of uplink transmit power from the first base station to the second base station comprises:
  transmitting a message comprising the configuration of uplink transmit power over an X2 interface between the first base station and the second base station.

5. The method of claim 1, further comprising:
  transmitting a time index associated the configuration from the first base station to the UE, wherein the time index indicates a plurality of time periods during which a first time period value for at least one of the first uplink transmit power value or the second uplink transmit power value in a first time period is different from a second time period value for the at least one of the first uplink transmit power value or the second uplink transmit power value in a second time period.

6. The method of claim 1, wherein the indication further indicates subframes or time periods for which the configuration of uplink transmit power applies.

7. A first base station for wireless communication, comprising:
  a processor,
  memory in electronic communication with the processor; and
  instructions stored in the memory and executable by the processor to cause the first base station to:
  coordinate multi-connectivity communication for a user equipment (UE) with at least the first base station and a second base station;
  determine a configuration of uplink transmit power for the UE in the multi-connectivity communication, the configuration including a first uplink transmit power value for the first base station and a second uplink transmit power value for the second base station; and
  transmit, by the first base station to the UE, an indication of the configuration of uplink transmit power wherein the configuration of uplink transmit power is dynamically adjustable by the UE such that an allocation of uplink transmit power for one of uplink communications to the first base station or uplink communications to the second base station is greater than the corresponding first or second uplink transmit power value, subject to a maximum transmit power for the UE.

8. The first base station of claim 7, wherein the instructions are further executable by the processor to cause the first base station to:
  receive a message from the second base station; and
  adjust at least one of the first uplink transmit power value for the first base station or the second uplink transmit power value for the second base station, the adjusting based at least in part on the message received from the second base station.

9. The first base station of claim 7, wherein the instructions are further executable by the processor to cause the first base station to:
  transmit the configuration of uplink transmit power from the first base station to the second base station.

10. The first base station of claim 9, wherein the instructions to transmit the configuration of uplink transmit power from the first base station to the second base station are executable by the processor to cause the first base station to:
  transmit a message comprising the configuration of uplink transmit power over an X2 interface between the first base station and the second base station.

11. The first base station of claim 7, wherein the instructions are further executable by the processor to cause the first base station to:
  transmit a time index associated with the configuration from the first base station to the UE, wherein the time index indicates a plurality of time periods during which a first time period value for at least one of the first uplink transmit power value or the second uplink transmit power value in a first time period is different from a second time period value for the at least one of the first uplink transmit power value or the second uplink transmit power value in a second time period.

12. The first base station of claim 7, wherein the indication further indicates subframes or time periods for which the configuration of uplink transmit power applies.

13. An apparatus for wireless communication, comprising:
  means for coordinating, by a first base station, multi-connectivity communication for a user equipment (UE) with at least the first base station and a second base station;
  means for determining, by the first base station, a configuration of uplink transmit power for the UE in the multi-connectivity communication, the configuration including a first uplink transmit power value for the first base station and a second uplink transmit power value for the second base station; and
  means for transmitting, by the first base station to the UE, an indication of the configuration of uplink transmit power, wherein the configuration of uplink transmit power is dynamically adjustable by the UE such that an allocation of uplink transmit power for one of uplink communications to the first base station or uplink communications to the second base station is greater than the corresponding first or second uplink transmit power value, subject to a maximum transmit power for the UE.

14. The apparatus of claim 13, further comprising:
  means for receiving, by the first base station, a message from the second base station; and
  means for adjusting at least one of the first uplink transmit power value for the first base station or the second uplink transmit power value for the second base station, the adjusting based at least in part on the message received from the second base station.

15. The apparatus of claim 13, further comprising:
  means for transmitting the configuration of uplink transmit power from the first base station to the second base station.

16. The apparatus of claim 15, wherein the means for transmitting the configuration of uplink transmit power from the first base station to the second base station comprises:
  means for transmitting a message comprising the configuration of uplink transmit power over an X2 interface between the first base station and the second base station.

17. The apparatus of claim 13, further comprising:
  means for transmitting a time index associated with the configuration from the first base station to the UE, wherein the time index indicates a plurality of time periods during which a first time period value for at least one of the first uplink transmit power value or the second uplink transmit power value in a first time period is different from a second time period value for the at least one of the first uplink transmit power value or the second uplink transmit power value in a second time period.

18. The apparatus of claim 13, wherein the indication further indicates subframes or time periods for which the configuration of uplink transmit power applies.

19. A non-transitory computer-readable medium storing code for wireless communication, the code comprising instructions executable by a processor to:
- coordinate, by a first base station, multi-connectivity communication for a user equipment (UE) with at least the first base station and a second base station;
- determine, by the first base station, a configuration of uplink transmit power for the UE in the multi-connectivity communication, the configuration including a first uplink transmit power value for the first base station and a second uplink transmit power value for the second base station; and
- transmit, by the first base station to the UE, an indication of the configuration of uplink transmit power, wherein the configuration of uplink transmit power is dynamically adjustable by the UE such that an allocation of uplink transmit power for one of uplink communications to the first base station or uplink communications to the second base station is greater than the corresponding first or second uplink transmit power value, subject to a maximum transmit power for the UE.

20. The non-transitory computer-readable medium of claim 19, wherein the instructions are further executable to:
- receive, by the first base station, a message from the second base station; and
- adjust at least one of the first uplink transmit power value for the first base station or the second uplink transmit power value for the second base station, the adjusting based at least in part on the message received from the second base station.

21. The non-transitory computer-readable medium of claim 19, wherein the instructions are further executable to:
- transmit the configuration of uplink transmit power from the first base station to the second base station.

22. The non-transitory computer-readable medium of claim 21, wherein the instructions to transmit the configuration of uplink transmit power from the first base station to the second base station are executable to:
- transmit a message comprising the configuration of uplink transmit power over an X2 interface between the first base station and the second base station.

23. The non-transitory computer-readable medium of claim 19, wherein the instructions are further executable to:
- transmit a time index associated with the configuration from the first base station to the UE, wherein the time index indicates a plurality of time periods during which a first time period value for at least one of the first uplink transmit power value or the second uplink transmit power value in a first time period is different from a second time period value for the at least one of the first uplink transmit power value or the second uplink transmit power value in a second time period.

24. The non-transitory computer-readable medium of claim 19, wherein the indication further indicates subframes or time periods for which the configuration of uplink transmit power applies.

* * * * *